United States Patent
Kivel et al.

(10) Patent No.: US 9,678,252 B2
(45) Date of Patent: Jun. 13, 2017

(54) MULTILAYER STACK WITH OVERLAPPING HARMONICS FOR WIDE VISIBLE-INFRARED COVERAGE

(71) Applicant: 3M INNOVATIVE PROPERTIES COMPANY, St. Paul, MN (US)

(72) Inventors: Edward J. Kivel, Stillwater, MN (US); Timothy J. Nevitt, Red Wing, MN (US); Michael F. Weber, Shoreview, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/048,077

(22) Filed: Feb. 19, 2016

(65) Prior Publication Data
US 2016/0170101 A1    Jun. 16, 2016

Related U.S. Application Data

(63) Continuation of application No. 13/866,853, filed on Apr. 19, 2013, now Pat. No. 9,279,921.

(51) Int. Cl.
*G02B 5/08* (2006.01)
*G02B 5/26* (2006.01)
(Continued)

(52) U.S. Cl.
CPC ......... *G02B 5/0816* (2013.01); *G02B 5/0841* (2013.01); *G02B 5/26* (2013.01);
(Continued)

(58) Field of Classification Search
None
See application file for complete search history.

(56) References Cited

U.S. PATENT DOCUMENTS 3,247,392 A    4/1966  Thelen
3,610,729 A    10/1971 Rogers
(Continued)

FOREIGN PATENT DOCUMENTS

KR     20100058407    6/2010
WO     WO 2008-144656 11/2008
WO     WO 2013-059228 4/2013

OTHER PUBLICATIONS

Selby, CRC Standard Mathematical Tables, 18th edition, 458 (1970).
(Continued)

*Primary Examiner* — Derek S Chapel

(57) ABSTRACT

A broadband mirror, polarizer, or other reflector includes at least one stack of microlayers. Microlayers in the stack are arranged into optical repeat units. At a design angle of incidence such as normal incidence, the stack provides a $1^{st}$ order reflection band, a $2^{nd}$ order reflection band, and optionally a $3^{rd}$ order reflection band. The $2^{nd}$ order reflection band overlaps, or substantially overlaps, the $1^{st}$ and/or $3^{rd}$ order reflection bands to form a single wide reflection band. The wide reflection band may include the $2^{nd}$ and $1^{st}$ but not a $3^{rd}$ order reflection band, or the $2^{nd}$ and $3^{rd}$ but not the $1^{st}$ order reflection band, or it may include the $1^{st}$, $2^{nd}$, and $3^{rd}$ order reflection bands, as well as still higher order reflection bands. The wide reflection band may cover at least a portion of visible and infrared wavelengths.

13 Claims, 17 Drawing Sheets

(51) Int. Cl.
 *G02B 5/28* (2006.01)
 *G02B 5/30* (2006.01)
(52) U.S. Cl.
 CPC ............. *G02B 5/281* (2013.01); *G02B 5/287* (2013.01); *G02B 5/3041* (2013.01)

(56) References Cited

U.S. PATENT DOCUMENTS

| | | |
|---|---|---|
| 4,446,305 A | 5/1984 | Rogers |
| 5,095,210 A | 3/1992 | Wheatley |
| 5,103,337 A | 4/1992 | Schrenk |
| 5,126,880 A | 6/1992 | Wheatley |
| 5,360,659 A | 11/1994 | Arends |
| 5,486,949 A | 1/1996 | Schrenk |
| 5,568,316 A | 10/1996 | Schrenk et al. |
| 5,882,774 A | 3/1999 | Jonza |
| 6,179,948 B1 | 1/2001 | Merrill |
| 6,531,230 B1 | 3/2003 | Weber |
| 6,667,095 B2 | 12/2003 | Wheatley |
| 6,783,349 B2 | 8/2004 | Neavin |
| 6,788,463 B2 | 9/2004 | Merrill |
| 6,927,900 B2 | 8/2005 | Liu |
| 7,019,905 B2 | 3/2006 | Weber |
| 7,138,173 B2 | 11/2006 | Wheatley |
| 7,385,763 B2 | 6/2008 | Nevitt |
| 7,636,193 B2 | 12/2009 | Bellanca |
| 7,652,736 B2 | 1/2010 | Padiyath |
| 7,851,054 B2 | 12/2010 | Weber |
| 8,368,857 B2 | 2/2013 | Kuo |
| 2004/0032658 A1 | 2/2004 | Fleming |
| 2008/0291361 A1 | 11/2008 | Weber |
| 2011/0272849 A1 | 11/2011 | Neavin |
| 2013/0063818 A1 | 3/2013 | Weber |
| 2013/0250405 A1 | 9/2013 | Kivel |
| 2016/0109628 A1* | 4/2016 | Weber ..................... G02B 5/26 359/352 |

OTHER PUBLICATIONS

PCT International Search Report for PCT/US2014/033958, mailed Aug. 18, 2014.

Radford et al., "Reflectivity of Iridescent Coextruded Multilayered Plastic Films," Polymer Engineering and Science, vol. 3, No. 13, pp. 216-221, May 1973.

Alfrey, Jr. et al., "Physical Optics of Iridescent Multilayered Plastic Films," Polymer Engineering and Science, vol. 9, No. 6, pp. 400-404, Nov. 1969.

* cited by examiner

MULTILAYER STACK WITH OVERLAPPING HARMONICS FOR WIDE VISIBLE-INFRARED COVERAGE

CROSS REFERENCE TO RELATED APPLICATION

This application is a continuation of U.S. patent application Ser. No. 13/866,853, filed Apr. 19, 2013, now pending, the disclosure of which is incorporated by reference in its entirety herein.

FIELD

The present disclosure relates to, among other things, multilayer optical films whose reflection and transmission characteristics are determined in large part by constructive and destructive interference of light reflected from interfaces within a stack of microlayers. The disclosure also relates to articles and systems incorporating such optical films, and methods of making and using such films.

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e., the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. In a broadband reflector, the microlayers are arranged in optical repeat units whose optical thickness values increase from a first side to a second side of the film. This arrangement of layer thicknesses is referred to as a graded layer thickness profile. Often, it is undesirable for such broadband reflectors to impart a significant colored (non-white) appearance to the system, whether at normal incidence or for obliquely incident light. The colored appearance occurs when the film has transmission or reflection characteristics that are not uniform over the visible portion of the spectrum. In the case of coextruded polymeric multilayer optical films, such non-uniformities are typically the result of imperfect control of the layer thickness profile of the film relative to a target profile. To avoid the color issue, polymeric multilayer optical films are often designed to provide along their principal axes either extremely low reflectivity and high transmission (e.g., for a pass axis of a reflective polarizer that is viewed in transmission) or extremely high reflectivity and low transmission (e.g., for a block axis of a reflective polarizer, or for any in-plane axis of a reflective mirror film that is viewed in reflection). However, in some cases intermediate amounts of reflection and transmission are desired. One approach to addressing color issues in such partially reflecting/partially transmitting films is to provide them with only a single packet or stack of microlayers with a carefully tailored layer thickness profile, and to manufacture them without the use of any layer multiplier devices, to provide maximum control of the layer thickness profile and a corresponding minimum spectral variability in transmission or reflection over the visible wavelength range.

Multilayer optical films tailored to provide high reflectivity in the infrared portion of the spectrum are also known. Such films are often designed to provide high reflectivity in a $1^{st}$ order reflection band at infrared wavelengths, and to suppress higher order reflections so as to avoid reflections in the visible portion of the spectrum. See e.g. U.S. Pat. No. 3,247,392 (Thelen), U.S. Pat. No. 5,103,337 (Schrenk et al.), U.S. Pat. No. 5,360,659 (Arends et al.), and U.S. Pat. No. 7,019,905 (Weber).

BRIEF SUMMARY

The present disclosure describes, among other things, multilayer optical films and film bodies in which a given contiguous microlayer stack provides, at normal incidence or some other design angle of incidence, at least a $1^{st}$ and $2^{nd}$ order reflection band, and in some cases also a $3^{rd}$ order reflection band. The $2^{nd}$ order reflection band overlaps one or both of the $1^{st}$ and $3^{rd}$ order reflection bands in order to provide a single wide reflection band that covers at least a portion of visible and infrared wavelengths. The single wide reflection band may be associated with orthogonal polarization states, as in the case of a mirror, or with only one polarization state, as in the case of a polarizer. For clarity and precision with regard to concepts such as whether a given reflection band "overlaps" or "substantially overlaps" another reflection band, whether a given reflection band is "distinct from" (i.e., not substantially overlapping, or spectrally separated from) another reflection band, or even whether a given reflection band even exists, we provide a detailed discussion below of what is meant by a "reflection band" for purposes of this application. The detailed discussion also defines, for purposes of this application, relevant spectral characteristics of a (single) reflection band, such as its short wavelength band edge, its long wavelength band edge, and its reflective power.

For purposes of this application, the visible wavelength range is assumed to range from 380 to 720 nm, and the infrared wavelength range is assumed to range from 720 to at least 2000 nm. Furthermore, a near ultraviolet (near UV) range is assumed to range from 300 to 380 nm.

Also disclosed are multilayer optical films and related articles that include a stack of microlayers arranged into optical repeat units. At a design angle of incidence, the stack provides a $1^{st}$ order reflection band, a $2^{nd}$ order reflection band, and optionally a $3^{rd}$ order reflection band. The $1^{st}$ order reflection band is disposed at least partially in a wavelength range from 720 to 2000 nm. The $2^{nd}$ order reflection band is disposed at least partially in a wavelength range from 380 to 720 nm. The $2^{nd}$ order reflection band substantially overlaps at least one of the $1^{st}$ and $3^{rd}$ order reflection bands to form a single wide reflection band. In some cases, the $2^{nd}$ order reflection band may be disposed partially in the near UV wavelength range from 300 to 380 nm, and if a $3^{rd}$ order reflection band is present, it may also be disposed at least partially in the near UV wavelength range.

The $2^{nd}$ order reflection band may substantially overlap the $1^{st}$ order reflection band, such that the single wide reflection band includes the $1^{st}$ and $2^{nd}$ order reflection bands. The $2^{nd}$ order reflection band may overlap the $1^{st}$ order reflection band. The $1^{st}$ and $2^{nd}$ order reflection bands may have substantially equal reflectivities, e.g., they may have average reflectivities that differ by less than a 10% fractional value. Alternatively, the $1^{st}$ and $2^{nd}$ order reflection bands have substantially different reflectivities e.g., they may have average reflectivities that differ by more than a 10% fractional value. In some cases, the stack may not provide the $3^{rd}$ order reflection band.

In other cases, stack may provide the $3^{rd}$ order reflection band. The $3^{rd}$ order reflection band may be disposed at least partially in a wavelength range from 300 to 380 nm. The $2^{nd}$ order reflection band may substantially overlap the $3^{rd}$ order reflection band such that the single wide reflection band includes the $2^{nd}$ and $3^{rd}$ order reflection bands. The $2^{nd}$ order reflection band may overlap the $3^{rd}$ order reflection band. The $2^{nd}$ order reflection band may not substantially overlap the $1^{st}$ order reflection band, such that the single wide reflection band does not include the $1^{st}$ order reflection band. The $2^{nd}$ and $3^{rd}$ order reflection bands have substantially equal reflectivities, e.g., they may have average reflectivities that differ by less than a 10% fractional value. Alternatively, the $2^{nd}$ and $3^{rd}$ order reflection bands may have substantially different reflectivities, e.g., they may have average reflectivities that differ by more than a 10% fractional value. The $2^{nd}$ order reflection band may cover at least 100 nm within a range from 380 to 720 nm. The single wide reflection band may have a step change in reflectivity, and the stack of microlayers may be characterized by a smoothly varying ORU thickness profile. The $2^{nd}$ order reflection band may be disposed at least partially in a wavelength range from 300 to 380 nm.

If the $2^{nd}$ order reflection band does not actually overlap but is sufficiently close to substantially overlap, for example, the $1^{st}$ order reflection band, then the $2^{nd}$ order reflection band may have a long wavelength band edge whose wavelength $\lambda_{L2nd}$ differs from a wavelength $\lambda_{S1st}$ of a short wavelength band edge of the $1^{st}$ order reflection band by no more than 5% of $\lambda_{S1st}$. Similarly, if the $2^{nd}$ order reflection band does not actually overlap but is sufficiently close to substantially overlap the $3^{rd}$ order reflection band, then the $2^{nd}$ order reflection band may have a short wavelength band edge whose wavelength $\lambda_{S2nd}$ differs from a wavelength $\lambda_{L3rd}$ of a long wavelength band edge of the $3^{rd}$ order reflection band by no more than 5% of $\lambda_{S2nd}$. We use the term "substantially overlap" and the like to encompass both the situation where the two reflection bands at issue actually overlap, i.e., wherein the long or short wavelength band edge of one band falls between the long and short band edges of the other band, and the situation where the two bands (as determined by their respective band edges) do not actually overlap but are within the 5% tolerances mentioned above.

The design angle of incidence may be normal incidence, or another desired angle of incidence. The film may be or comprise a polarizer, and the $1^{st}$, $2^{nd}$, and $3^{rd}$ order reflection bands may all be associated with only one of two orthogonal polarization states. Alternatively, the film may be or comprise a mirror, and the $1^{st}$, $2^{nd}$, and $3^{rd}$ order reflection bands may all be associated with two orthogonal polarization states.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The disclosure may be more completely understood in connection with the accompanying drawings, in which.

The schematic drawings presented herein are not necessarily to scale; however, graphs are assumed to have accurate scales unless otherwise indicated. Like numbers used in the figures refer to like elements.

DETAILED DESCRIPTION

As mentioned above, we disclose here inter alia optical articles such as multilayer optical films and film combinations in which at least one microlayer stack or packet provides multiple harmonic reflection bands at a design angle of incidence, including a $2^{nd}$ order reflection band and a $1^{st}$ order reflection band, and the $2^{nd}$ order reflection band overlaps or substantially overlaps the $1^{st}$ order reflection band and/or a $3^{rd}$ order reflection band, if present, to provide a single wide reflection band that covers at least a portion of visible and infrared wavelengths. The relationships provided in this disclosure between reflection bands of a given stack, and between reflection bands of different stacks, rely upon a clear and precise definition for what a reflection band is and what some of its characteristic features are, particularly, the spectral location of the opposed boundaries or edges of the reflection band. Such definitions are provided further below for purposes of this disclosure, following a discussion of optical repeat units (ORUs), multilayer stacks, and harmonic reflections.

In some cases, the disclosed optical film constructions may provide a smooth spectrum for the in-band transmitted and reflected light of broadband partial reflectors. Such broadband partial reflectors may substantially eliminate in-band ringing, and provide a smooth spectrum for the in-band transmitted and reflected light. It has been found that broadband partial reflector optical film that has an apodized graded thickness profile reduces or substantially eliminates in-band spectrum ringing and consequentially reduces or substantially eliminates undesired color. The use of an apodization technique to terminate a graded layer thickness profile so as to minimize spectral features such as spectral ringing (which may be undesirable in some applications) is described further in U.S. patent publication 2013/0250405, incorporated herein by reference.

For purposes of the figures illustrated and described herein, for simplicity, the multilayer optical film bodies are assumed to have no spatial variability in the plane of the film body. Thus, the spectral reflection and transmission characteristics of a given film body are assumed to be independent of the position or location on the film (e.g., the (x,y) coordinate) at which they are measured. However, in general, any of the disclosed film bodies may be made to have spatial variability in the plane of the film body, in accordance with known film design, processing, and post-processing techniques.

Figure 1:
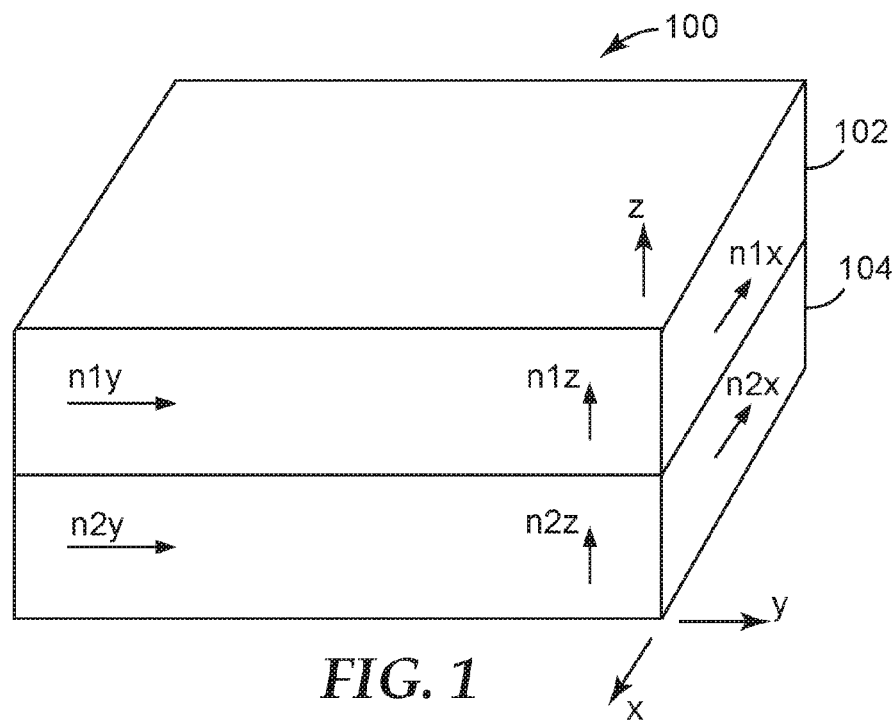
FIG. 1 is a schematic perspective view of an exemplary optical repeat unit (ORU) of a multilayer optical film.

Referring now to FIG. 1, a schematic perspective view of an exemplary optical repeat unit (ORU) of a multilayer optical film is shown. FIG. 1 depicts only two layers of a multilayer optical film 100, which can include tens or hundreds of such layers arranged in one or more contiguous packets or stacks. The film 100 includes individual microlayers 102, 104, where "microlayers" refer to layers that are sufficiently thin so that light reflected at a plurality of interfaces between such layers undergoes constructive or destructive interference to give the multilayer optical film the desired reflective or transmissive properties. The microlayers 102, 104 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by the relevant refractive index) of less than about 1 micrometer. Thicker layers can, however, also be included, such as skin layers at the outer surfaces of the film, or protective boundary layers (PBL) disposed within the film that separate packets of microlayers, as desired.

Refractive indices of one of the microlayers (e.g. layer 102 of FIG. 1, or the "A" layers of FIG. 2 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 104 in FIG. 1 or the "B" layers in FIG. 2) along the same axes are n2x, n2y, n2z, respectively. The differences in refractive index between these layers are $\Delta$nx (=n1x−n2x) along the x-direction, $\Delta$ny (=n1y−n2y) along the y-direction, and $\Delta$nz (=n1z−n2z) along the z-direction. The nature of these refractive index differences, in combination with the number of microlayers in the film (or in a given stack of the film) and their thickness distribution, control the reflective and transmissive characteristics of the film (or of the given stack of the film). For example, if adjacent microlayers have a large refractive index mismatch along one in-plane direction ($\Delta$nx large) and a small refractive index mismatch along the orthogonal in-plane direction ($\Delta$ny≈0), the film or packet may behave as a reflective polarizer for normally incident light. A reflective polarizer may be considered to be an optical body that strongly reflects normally incident light that is polarized along one in-plane axis, referred to as the "block axis," if the wavelength is within the reflection band of the packet, and strongly transmits such light that is polarized along an orthogonal in-plane axis, referred to as the "pass axis."

If desired, the refractive index difference ($\Delta$nz) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta$nz between microlayers can be controlled to be substantially less than the maximum in-plane refractive index difference $\Delta$nx, such that $\Delta$nz≤0.5*$\Delta$nx. Alternatively, $\Delta$nz≤0.25*$\Delta$nx. A zero or near zero magnitude z-index mismatch yields interfaces between microlayers whose reflectivity for p-polarized light is constant or near constant as a function of incidence angle. Furthermore, the z-index mismatch $\Delta$nz can be controlled to have the opposite polarity compared to the in-plane index difference $\Delta$nx, i.e., $\Delta$nz<0. This condition yields interfaces whose reflectivity for p-polarized light increases with increasing angles of incidence, as is the case for s-polarized light. If $\Delta$nz>0, then the reflectivity for p-polarized light decreases with angle of incidence. The foregoing relationships also of course apply to relationships involving $\Delta$nz and $\Delta$ny, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 2:
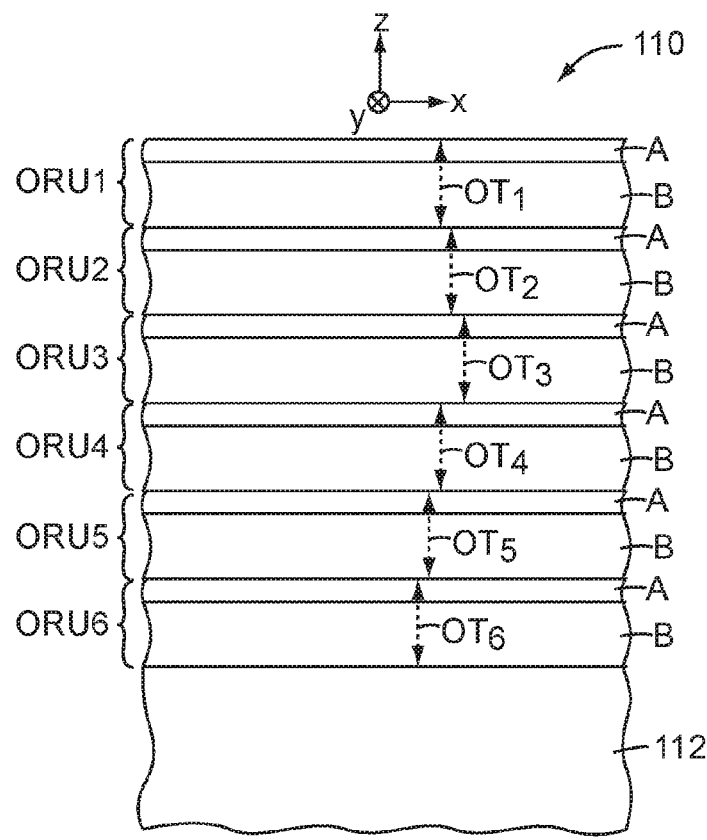
FIG. 2 is a schematic perspective view of a portion of a multilayer optical film, this view showing a packet or stack of microlayers and a plurality of ORUs.

In the schematic side view of FIG. 2, more interior layers of a multilayer film 110 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 2, the microlayers are labeled "A" or "B," the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired. The multilayer optical film 110 is shown as having a substantially thicker layer 112, which may represent an outer skin layer, or a protective boundary layer ("PBL," see U.S. Pat. No. 6,783,349 (Neavin et al.)) that may separate the stack of microlayers shown in the figure from another stack or packet of microlayers (if present). Furthermore, if desired, two or more separate multilayer optical films can be laminated together, e.g., with one or more thick adhesive layers, or using pressure, heat, or other methods to form a laminate or composite film.

In general, the boundaries of the microlayers may be abrupt or can be gradual. For the latter case, the index of refraction can change gradually from a region of, e.g., high index to a region of low index within a distance along the thickness direction of a ½ wavelength. The microlayers described herein may each be a blend of two or more materials. For example each microlayer may comprise both materials A and B but in different ratios so as to provide a spatial variation of refractive index from low to high. When using terms such as a "stack of microlayers", a "packet of microlayers", or the like, we intended to include a region in a film having a continuously varying index from high to low and back to high in a repeating fashion so as to form a continuous set of ORUs having no intervening optically thick layer or region. The optical thickness of an ORU is understood to be ½ wavelength, whether the index of refraction changes gradually or abruptly.

In some cases, the microlayers of a given stack or packet can have thicknesses and refractive index values corresponding to a ¼-wave stack, i.e., arranged in ORUs each having two adjacent microlayers of equal optical thickness, such ORU being effective to reflect by constructive interference light whose wavelength λ is twice the overall optical thickness of the optical repeat unit. The "optical thickness" of a body refers to its physical thickness multiplied by its refractive index. A ¼-wave stack, in which the two adjacent microlayers in each ORU have equal optical thickness, is said to have an "f-ratio" of 0.5 or 50%. "F-ratio" in this regard refers to the ratio of the optical thickness of a constituent layer "A" to the optical thickness of the complete optical repeat unit, where the constituent layer "A" is assumed to have a higher refractive index than the constituent layer "B"; if the layer "B" has the higher refractive index, then the f-ratio is the ratio of the optical thickness of the constituent layer "B" to the optical thickness of the complete optical repeat unit. The use of a 50% f-ratio is often considered desirable because it maximizes the reflective power of the $1^{st}$ order reflection band of a stack of microlayers, as explained below. However, also as explained below, a 50% f-ratio suppresses or eliminates the $2^{nd}$ order reflection band. This too is often considered desirable in many applications; however, it is not desirable for purposes of the harmonic overlap approach discussed herein, in which a $2^{nd}$ order reflection band of a given stack of microlayers overlaps with a $1^{st}$ and/or $3^{rd}$ order reflection band from the same stack to provide a widened continuous reflection band.

Therefore, in other cases, the optical thickness of the microlayers in an optical repeat unit may be different from each other, whereby the f-ratio is greater than or less than 50%. For purposes of the present application, we contemplate multilayer optical films that contain a microlayer stack whose f-ratio may be any suitable value in accordance with the teachings herein, with particular attention given to stacks whose f-ratio is other than 50%. Accordingly, in the embodiment of FIG. 2, the "A" layers are depicted for generality as being thinner than the "B" layers. Each depicted optical repeat unit (ORU 1, ORU 2, etc.) has an optical thickness (OT1, OT2, etc.) equal to the sum of the optical thicknesses of its constituent "A" and "B" layer, and each optical repeat unit provides $1^{st}$ order reflection of light whose wavelength λ is twice the overall optical thickness of the ORU.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g., the top) to the other side of the stack (e.g., the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is often distinguishable from the color that may be considered undesired in that the desired color is associated with relatively slow changes in the spectral reflection or transmission, whereas the undesired color is associated with faster changes in those parameters as a function of wavelength. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm, although this number depends somewhat on the magnitude of localized disruptions in the layer thickness profile.

It may also be desirable in some cases to provide substantially different levels of reflectivity over the visible spectrum compared to the infrared spectrum. For example, one may wish to provide a high level of reflectivity (and correspondingly low level of transmission) over a range of infrared wavelengths, and a lower level of reflectivity (and higher transmission) over some or all of the visible spectrum. In some cases, an abrupt step change in reflectivity and transmission can be produced as a result of a partial spectral overlap of two harmonic reflection bands, and/or as a result of different reflectivities of two adjacent overlapping or substantially overlapping harmonic reflection bands. Some such embodiments are described further below.

To achieve reflectivity with a reasonable number of layers, adjacent microlayers may exhibit a difference in refractive index (Δnx) for light polarized along the x-axis of at least 0.03, for example. If high reflectivity is desired for two orthogonal polarizations, then the adjacent microlayers also may exhibit a difference in refractive index (Δny) for light polarized along the y-axis of at least 0.03, for example. In some cases, adjacent microlayers may have refractive index mismatches along the two principal in-plane axes (Δnx and Δny) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index (Δnx) for light polarized along the x-axis and a smaller but still substantial difference in refractive index (Δny) for light polarized along the y-axis. In variations of such embodiments, the adjacent microlayers may exhibit a refractive index match or mismatch along the z-axis (Δnz=0 or Δnz large), and the mismatch may be of the same or opposite polarity or sign as the in-plane refractive index mismatch (es). Such tailoring of Δnz plays a key role in whether the reflectivity of the p-polarized component of obliquely incident light increases, decreases, or remains the same with increasing incidence angle.

Both reflectors whose reflectivity increases with angle of incidence, and reflectors whose reflectivity along a given principal axis decreases with angle of incidence, can be made with reduced color if desired using apodizing techniques. This may be important for films whose reflectivity is large at normal incidence and are viewed in transmitted light at various angles, including normal incidence.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

The disclosed multilayer optical films can be made using any suitable light-transmissive materials, but in many cases it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 1, i.e., R+T≈1, or R≈1−T. Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g., U.S. Pat. No. 6,783,349 (Neavin et al.), In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multi-packet films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

If the optical thicknesses of all of the microlayers in a given multilayer film were designed to be the same, the film would provide high reflectivity over only a narrow band of wavelengths. Such a film would appear highly colored if the band was located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Exemplary multilayer optical film bodies are provided with broadband reflectivity and transmission, e.g., over the entire visible spectrum, or over at least a portion of visible and infrared (IR) wavelengths, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths.

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g., via a tenter), along the down-web direction (e.g., via a length oriented), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

At least one difference between vacuum deposited stack designs and coextruded polymeric multilayer stack designs is the shape of the layer profile distribution. With vacuum deposited films, the desired spectrum is achieved by individually adjusting the thickness of every layer in the stack so it conforms to a computer optimized stack design. In this manner, issues such as spectral ripple are routinely minimized. Adjacent layers sometimes differ in thickness by a factor of 10, with thickness values often ranging from about 0.05 λ to 1.0 λ. With coextruded polymeric film stacks, on-line monitoring and control of individual layers in this manner is not yet a viable option with this technology. As a result, spectral shape is controlled mainly by the shape of a continuous and smoothly varying layer thickness profile. Such profiles are, however, not restricted to polymeric film stacks.

Overlapping Harmonic Reflection Bands from a Given Optical Stack to Produce a Single Widened Reflection Band We have found that particularly efficient use of multilayer optical film stacks, especially in applications that call for high or at least substantial reflectivity over a wide spectral range that spans both visible and infrared wavelengths, can be made by overlapping multiple harmonic reflection bands from a given multilayer stack or packet in an optical article, including at least one $2^{nd}$ order reflection band. Efficiency can be enhanced by making use of not only $1^{st}$ order reflections but also $2^{nd}$ order reflections in the functional operation of the article, and by tailoring the stack so that the $2^{nd}$ order reflection band overlaps, or substantially overlaps, the $1^{st}$ order reflection band and/or a $3^{rd}$ order reflection band to produce a widened and combined, continuous reflection band. The reader should understand that in some cases the stack of microlayers may produce at least one other reflection band that is spectrally separated from, and not a part of, the single continuous reflection band. For example, as described below in connection with FIGS. 11A and 11B, the $2^{nd}$, $3^{rd}$, and $4^{th}$ order reflection bands may overlap with each other to form a single, widened, continuous reflection band, but the stack of microlayers may also produce a $1^{st}$ order reflection band that is spaced apart from, and not a part of, such widened reflection band.

Furthermore, in order to produce significant $2^{nd}$ order reflections, the relative thicknesses of the "A" and "B" microlayers in a given stack are tailored so that the f-ratio of the optical repeat units is significantly different from 0.5 (50%), and this design feature can also provide significant benefits to the film manufacturer. In particular, to the extent material "A" of the "A" microlayers is more expensive than material "B" of the "B" microlayers (or vice versa), one can select an f-ratio that reduces the amount of material "A", and increases the amount of material "B", in the stack (or vice versa), relative to a stack design whose f-ratio is 0.5. By selecting the "thinner" microlayer in the ORU to be the more expensive material and the "thicker" microlayer in the ORU to be the less expensive material, the overall raw material cost of the finished film can be significantly reduced. For example, optical quality polyethylene naphthalate (PEN) is currently more expensive than optical quality polyethylene terephthalate (PET); therefore, to achieve a target f-ratio other than 50% that produces a significant $2^{nd}$ order reflection, the thickness of a PEN microlayer in each optical repeat unit can be reduced while the thickness of a PET microlayer in each optical repeat unit can be increased, thereby reducing the overall material cost of the film.

Figure 3:
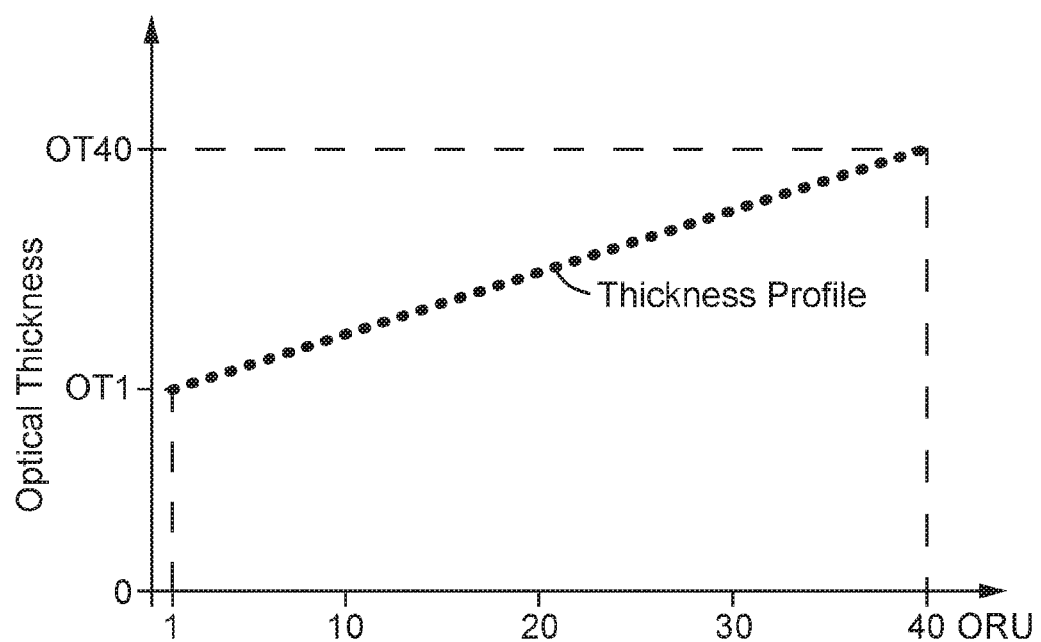
FIG. 3 is an idealized representation of a layer thickness profile of a stack of microlayers forming a group of ORUs.

Turning now to FIG. 3, we see there an idealized representation of a thickness profile of a stack of microlayers forming a group of ORUs, this particular stack having no apodized portions. Each discrete point of the thickness profile represents the optical thickness of one ORU. The graph assumes 40 ORUs, arranged in order from one end of the stack to the other, but more or fewer than 40 ORUs can be used in alternative embodiments. The thickness profile exhibits a gradient in thickness, from a minimum of OT1 at ORU 1 to a maximum of OT40 at ORU 40. The gradient has the effect of broadening the spectral width of the reflection band produced by the stack, relative to a similar stack that has no gradient in thickness. A simple linear thickness profile is shown for simplicity, but more complex profiles, e.g. employing curves, bends, and/or apodized portions, can also be employed.

Note that the thickness profile of the ORUs does not reveal any information about the f-ratio used in the stack, since individual layer thicknesses are not shown. Stated differently, a given ORU thickness profile, including that of FIG. 3, can be implemented in a multitude of different ways by tailoring the f-ratio differently, while keeping the optical thicknesses of the ORUs unchanged. For example, in some cases the "A" microlayer may be substantially thinner than the "B" microlayer in each ORU, while in other cases the "A" microlayer may be substantially thicker than the "B" microlayer in each ORU, while in still other cases the "A" and "B" microlayers may be about the same thickness in each ORU.

Figure 4:
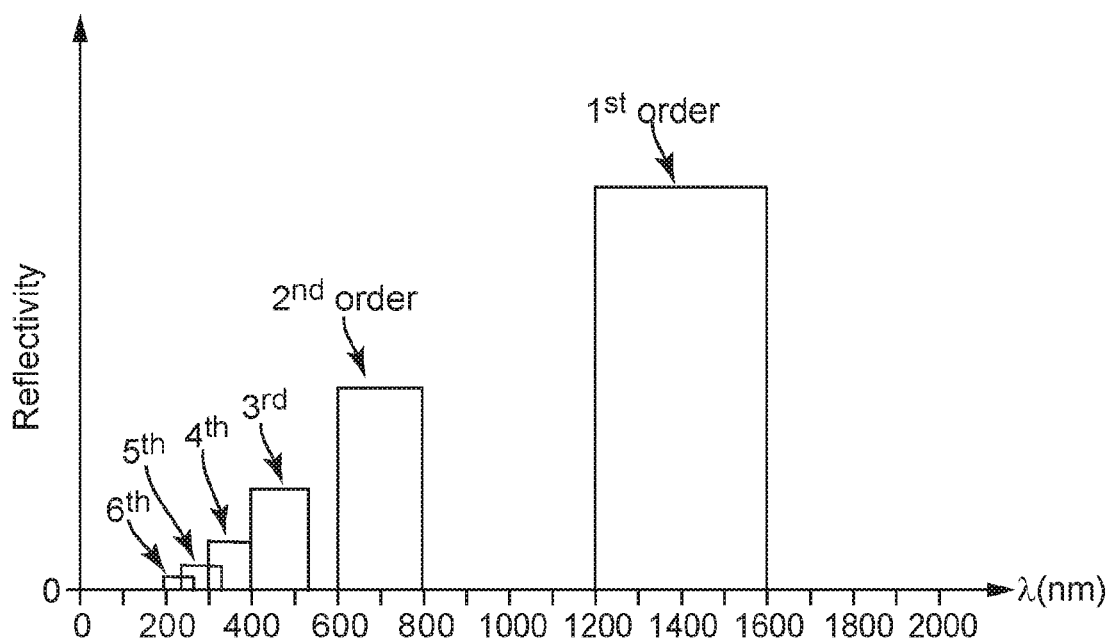
FIG. 4 is an idealized schematic representation of various harmonic reflection bands that a microlayer stack such as that of FIG. 3 may produce, depending on design details of the stack.

In FIG. 4, an idealized schematic representation shows various harmonic reflection bands that a microlayer stack such as that of FIG. 3 may produce, depending on design details of the stack. A reflection band in this regard, for purposes of this application, refers to a single confined region of increased reflectivity on a plot of reflectivity versus wavelength, where the reflectivity achieves a value of at least 30% within the region. The reflection band of each harmonic order is shown in simplified or idealized fashion to have two opposed, straight, vertical band edges, a flat or uniform reflectivity within the band, and no ripple or ringing. Although reflection bands of this rectangular shape cannot be found in real films, the idealized rectangular reflection bands can be useful for approximating or representing an actual reflection band having a more complicated shape. For illustrative purposes, a $1^{st}$, $2^{nd}$, $3^{rd}$, $4^{th}$, $5^{th}$, and $6^{th}$ order reflection band are all shown on the same graph, but in practice some would typically be absent or substantially absent from the reflectivity spectrum, depending on the f-ratio used for the stack. Also, the reflectivities of the harmonics are shown as monotonically decreasing as the order number increases, but this is not always the case. In some cases, a reflection band that has greater reflectivity than another reflection band may also have a higher order number.

Figure 5A:
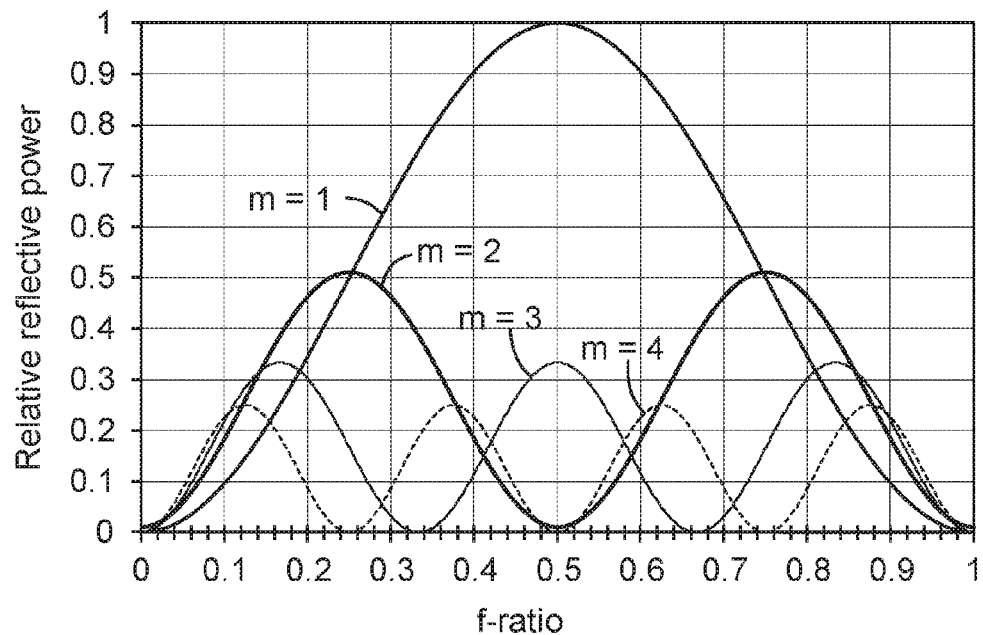
FIG. 5A is a graph of relative reflective power as a function of the f-ratio of a microlayer stack.

In this regard, reference is made to FIG. 5A. This figure is a graph of relative reflective power as a function of the f-ratio of a microlayer stack. In this regard, the "reflective power" of a microlayer stack refers to the area under the negative of the Log(1−R) spectrum (optical density), normalized by dividing by the wavelength. With numerical integration, each incremental area of the reflective power spectrum can be divided by the local wavelength: $(\text{Log}(1-R(\lambda_n))) \times (\lambda_{n+1}-\lambda_n)/\lambda_n$. (The parameter "R" here refers to the reflectivity of the stack, which is a function of wavelength. A value of R=1 corresponds to a reflectivity of 1.0 or 100%, a value of R=0.5 corresponds to a reflectivity of 0.5 or 50%, and so forth.) The reflective power of individual harmonic bands generated by the stack can be determined in this way, provided they do not overlap with one another. By optical modeling or experimentation it can be shown that the reflective power of a stack of alternating high and low refractive index layers with small refractive index differentials, such as those found in polymeric multilayer optical stacks, is proportional to the square of the refractive index differential. The effect of the f-ratio on this reflective power can be expressed using an effective index differential for a given mth harmonic order band as follows:

$$\Delta n_{effective} = c_m \frac{\pi}{4} \Delta n,$$

where $\Delta n$ is the actual refractive index difference, and $c_m$ is the Fourier coefficient of the Fourier representation of the asymmetric square wave refractive index waveform of the stack for the $m^{th}$ order term in the series. The reflective power (RP) in a given harmonic reflection band can be shown to be proportional to the square of this effective index differential;

$$RP \propto (\Delta n_{effective})^2.$$

The Fourier coefficient for each order m of an asymmetric square wave is given by:

$$c_m = \left(\frac{4}{m\pi}\right) \times |\sin(m\pi f)|,$$

where f is the f-ratio. From these equations one can see that the reflective power RP is proportional to the following simple formula:

$$RP \propto \left(\frac{1}{m}\right) \sin^2(m\pi f).$$

This function, after normalizing by setting the maximum reflective power of the $1^{st}$ order reflection band (which occurs when the f-ratio equals 0.5) to 1.0, is plotted in FIG. 5A for several harmonic orders. Curves are provided for each of the first 4 harmonic orders, i.e., for $1^{st}$ order reflection (m=1), $2^{nd}$ order reflection (m=2), $3^{rd}$ order reflection (m=3), and $4^{th}$ order reflection (m=4). Inspection of the graph reveals that at an f-ratio of 0.5 (or 50%), $1^{st}$ and $3^{rd}$ order reflections are maximized, while $2^{nd}$ and $4^{th}$ order reflections are zero. In contrast, at an f-ratio of ⅓ or ⅔ (about 33% or 67% respectively), $1^{st}$ order reflection is substantial but diminished, somewhat from its maximum, $2^{nd}$ and $4^{th}$ order reflections are substantial but less than the $1^{st}$ order reflection, and the $3^{rd}$ order reflection is zero. A wide variety of relative reflective magnitudes of the different harmonic orders can be obtained by selecting a desired f-ratio. We can refer to relative reflective power, for a given mth order harmonic, as $\alpha_m$.

Figure 5B:
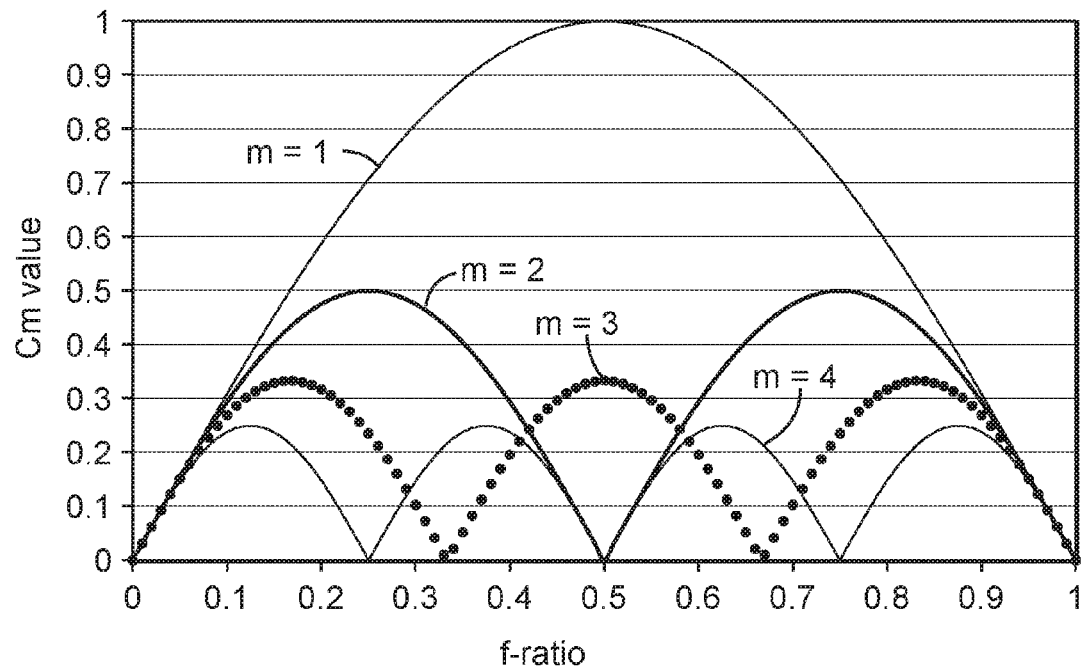
FIG. 5B is a graph of relative Fourier coefficient amplitude as a function of the f-ratio of a microlayer stack.

FIG. 5B is related to FIG. 5A in that FIG. 5B plots the relative amplitude of the Fourier coefficient $c_m$ as a function of f-ratio, with curves for different harmonic order numbers m being shown in the figure.

Figure 6A:
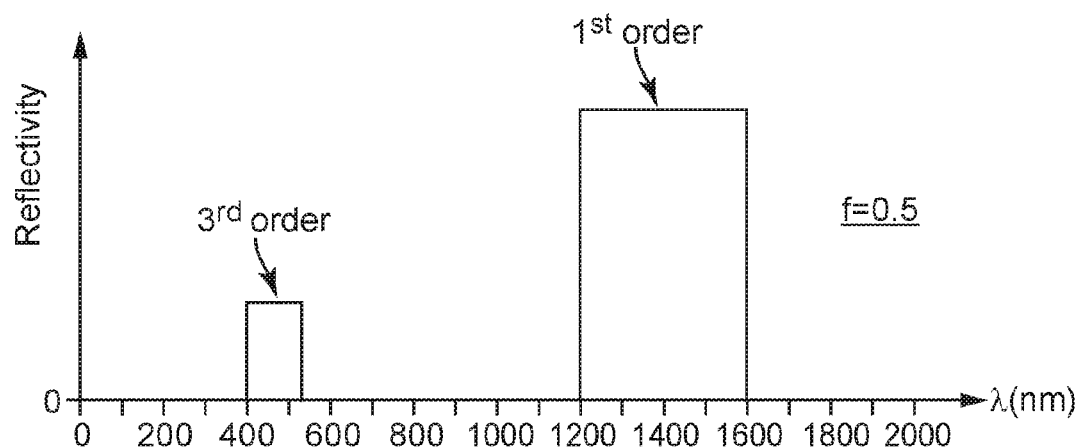
FIG. 6A is an idealized schematic representation showing which harmonic reflection bands (up to the $4^{th}$ order) are produced by a microlayer stack having an f-ratio of 0.5.
Figure 6B:
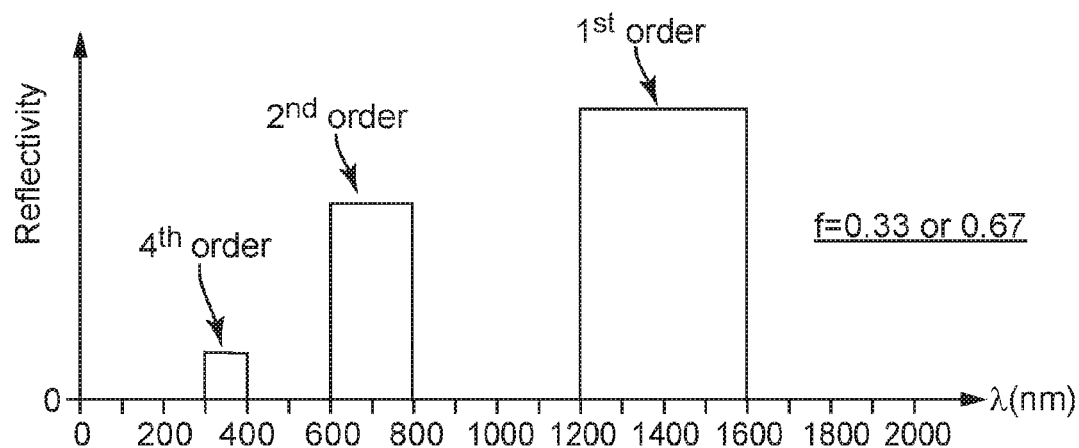
FIG. 6B is an idealized schematic representation similar to FIG. 6A, but where the microlayer stack has an f-ratio of $\frac{1}{3}$ or $\frac{2}{3}$.

FIGS. 6A and 6B are idealized spectral reflectivity graphs for a single microlayer stack similar to that of FIG. 4, but FIGS. 6A and 6B assume the stack is made with specific f-ratios which have ramifications for which harmonic orders are present in, and which are absent from, the respective reflection spectra. In particular, FIG. 6A assumes the stack is made with an f-ratio of 0.5. In this case, in accordance with FIG. 5A, the $1^{st}$ and $3^{rd}$ order reflection bands from FIG. 4 are present, and the $2^{nd}$ and $4^{th}$ order reflection bands from FIG. 4 are absent. FIG. 6B assumes an f-ratio of ⅓ or ⅔, which yields substantial $1^{st}$, $2^{nd}$, and $4^{th}$ order reflection bands, but no $3^{rd}$ order reflection band.

The overlapping technique described herein relies upon suitably tailoring the spectral reflectivity of a subject microlayer stack by appropriate selection of design parameters such as individual microlayer materials and their respective refractive indices and index differences, number of microlayers and ORUs, layer thickness profile of the optical repeat units, and f-ratio of the ORUs in the stack. In some cases, a second microlayer stack may be placed in optical series with the subject stack such that light transmitted by the subject stack impinges on the second stack, and/or light transmitted by the second stack impinges on the subject stack. Multilayer optical films that embody arrangements such as these are shown schematically in FIGS. 7 and 8.

Figure 7:
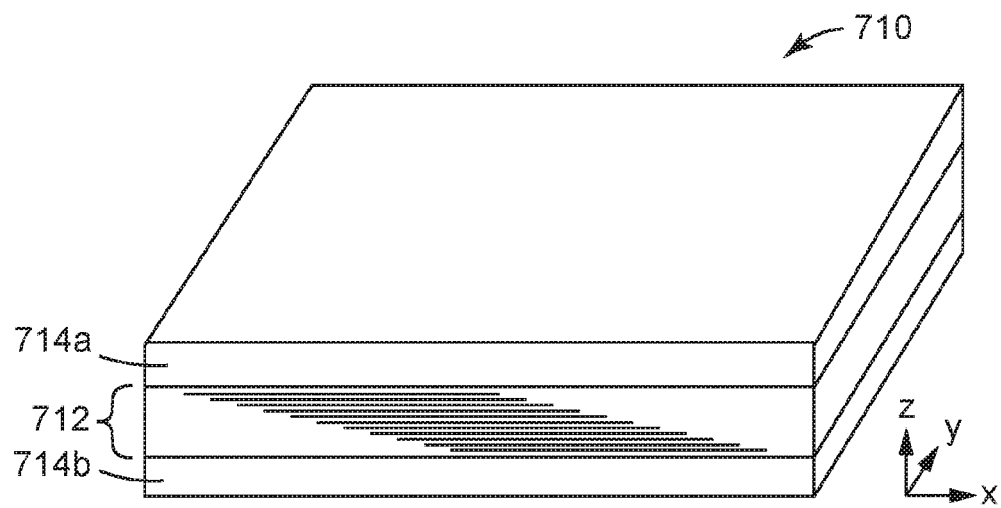
FIG. 7 is a schematic perspective view of a multilayer optical film having one stack of microlayers.
Figure 8:
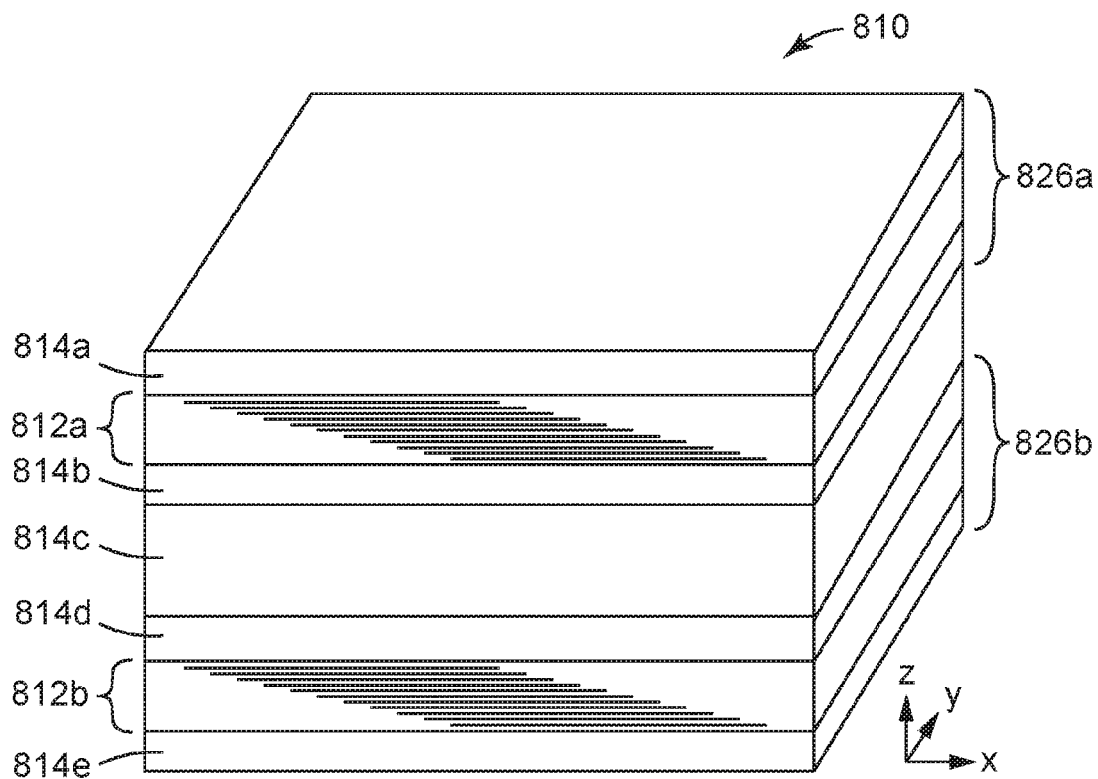
FIG. 8 is a schematic perspective view of a multilayer optical film article having two distinct stacks of microlayers.

In FIG. 7, an article 710 may be an optical film made by coextrusion and optional orientation or stretching in one or two directions. The article 710 has a microlayer stack 712 sandwiched between optically thick layers 714a, 714b. The optically thick layers 714a, 714b may be protective boundary layers (PBLs) and/or skin layers. The stack 712 includes microlayers but no optically thick layers. The microlayers may be arranged into ORUs with refractive indices and layer thickness profiles tailored to produce multiple harmonic reflection bands, including at least the $2^{nd}$ order reflection band, which overlap or substantially overlap with each other, as discussed above.

In some cases, the packet or stack of microlayers can be combined with other microlayer stacks, whether as part of a single coextruded optical film, or as films that are manufactured separately and later bonded to each other or otherwise combined. For example, in FIG. 8, an article 810 may be made from two optical films 826a, 826b that are separately coextruded and manufactured, and that laminated or otherwise bonded together with an optically thick layer 814c, which may e.g. be or comprise an optically clear adhesive. The film 826a includes a first microlayer stack 812a and optional optically thick layers 814a, 814b such as PBLs. The film 826b includes a second microlayer stack 812b and optional optically thick layers 814d, 814e such as PBLs. Any light that travels in the negative z-direction, and that is transmitted by the first stack 812a, impinges on the second stack 812b. Any light that travels in the positive z-direction, and that is transmitted by the second stack 812b, impinges on the first stack 812a. The reflective properties of the first and second stacks can thus be combined in the article 810. In some cases the first stack 812a may employ the harmonic band overlapping technique described herein, while the second stack 812b does not. In other cases, the first and second stacks 812a, 812b may each employ the overlapping technique. In some cases, the stacks may be designed such that one of the stacks provides a $1^{st}$ or higher order reflection band in region of the spectrum where the other stack has little or no reflection, e.g. in a pass band between other reflection bands.

We will now describe some representative cases of a multilayer stack that is designed to provide overlapping harmonic reflection bands to yield an extended or widened reflection band. In each case, the $2^{nd}$ order reflection band overlaps, or substantially overlaps, with the $1^{st}$ order reflection band and/or the $3^{rd}$ order reflection band, if any. We initially describe some representative cases in connection with simplified spectral reflectivity diagrams, see FIGS. 9A through 11B. We later describe some representative cases in connection with embodiments having specific ORU thickness profiles and f-ratios, for which we have calculated or modeled their reflectivity characteristics. See FIGS. 13 through 18B. Lastly, we describe a comparative example in which the microlayer stack at issue has a $2^{nd}$ order reflection band that does not substantially overlap either the $1^{st}$ or the $3^{rd}$ order reflection band. See FIGS. 19 through 21.

Figure 9A:
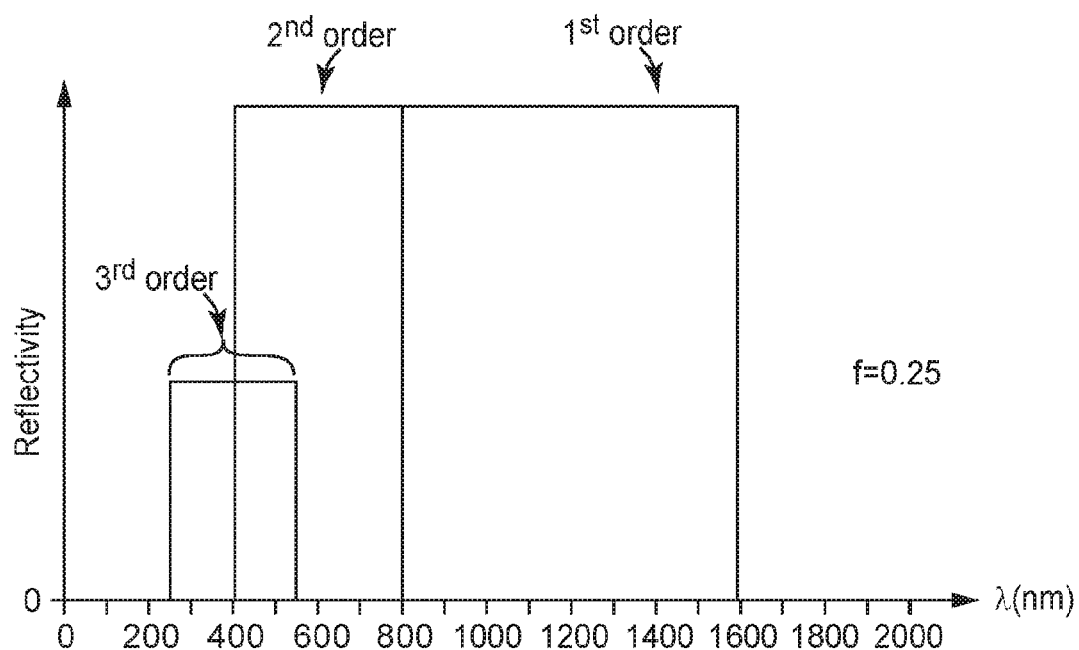
FIG. 9A is an idealized graph of reflectivity versus wavelength, demonstrating how distinct harmonic reflection bands (including in particular a $2^{nd}$ order reflection band) from a given microlayer stack can be made to overlap, by using an f-ratio of 0.25 and a suitably tailored layer thickness profile.

FIG. 9A illustrates one case in which the $2^{nd}$ order reflection band is made to overlap at least one of the $1^{st}$ and $3^{rd}$ order reflection bands to produce a single widened reflection band. In brief, a microlayer stack is tailored so that the stack provides a number of harmonic reflection bands. The ORU thickness gradient of the stack covers a range of optical thicknesses so that the $1^{st}$, $2^{nd}$, and $3^{rd}$ order reflection bands are as shown in the figure, assuming light of a given polarization state and at a design angle of incidence, such as normal incidence. All reflection bands in the figure are depicted in simplified or idealized form, i.e. with rectangular shapes, for ease of explanation. The f-ratio of the microlayer stack is 0.25. In accordance with FIG. 5A, this f-ratio produces a $1^{st}$, $2^{nd}$ and $3^{rd}$ harmonic, with the reflective power of the $1^{st}$ order being the same as that of the $2^{nd}$ order, and the $3^{rd}$ order having a lower but non-zero reflective power. In the figure, no scale is provided on the vertical "Reflectivity" axis for generality, but the relative heights of the different bands are at least roughly accurate, insofar as the $1^{st}$ and $2^{nd}$ order bands have about the same reflectivity, and the $3^{rd}$ order band has a substantially reduced reflectivity. The $1^{st}$ order band extends from a left band edge at 800 nm to a right band edge at 1600 nm. The $2^{nd}$ order band extends from a left band edge at 400 nm to a right band edge at 800 nm. The $3^{rd}$ order band extends from a left band edge at 266 nm to a right band edge at 533 nm. Harmonics higher than $3^{rd}$ order are not shown for simplicity. Thus, the $2^{nd}$ order reflection band (spectrally) overlaps both the $1^{st}$ order reflection band and the $3^{rd}$ order reflection band. Overlap of the $2^{nd}$ order band with the $1^{st}$ order band is established when the right band edge of the $2^{nd}$ order band coincides with the left band edge of the $1^{st}$ order band, or when the right band edge of $2^{nd}$ order band falls within the $1^{st}$ order band, i.e., when the right band edge of $2^{nd}$ order band is between the left and right band edges of the $1^{st}$ order band. Similarly, overlap of the $2^{nd}$ order band with the $3^{rd}$ order band is established when the left band edge of the $2^{nd}$ order band coincides with the right band edge of the $3^{rd}$ order band, or when the left band edge of $2^{nd}$ order band falls within the $3^{rd}$ order band, i.e., when the left band edge of $2^{nd}$ order band is between the left and right band edges of the $3^{rd}$ order band.

Figure 9B:
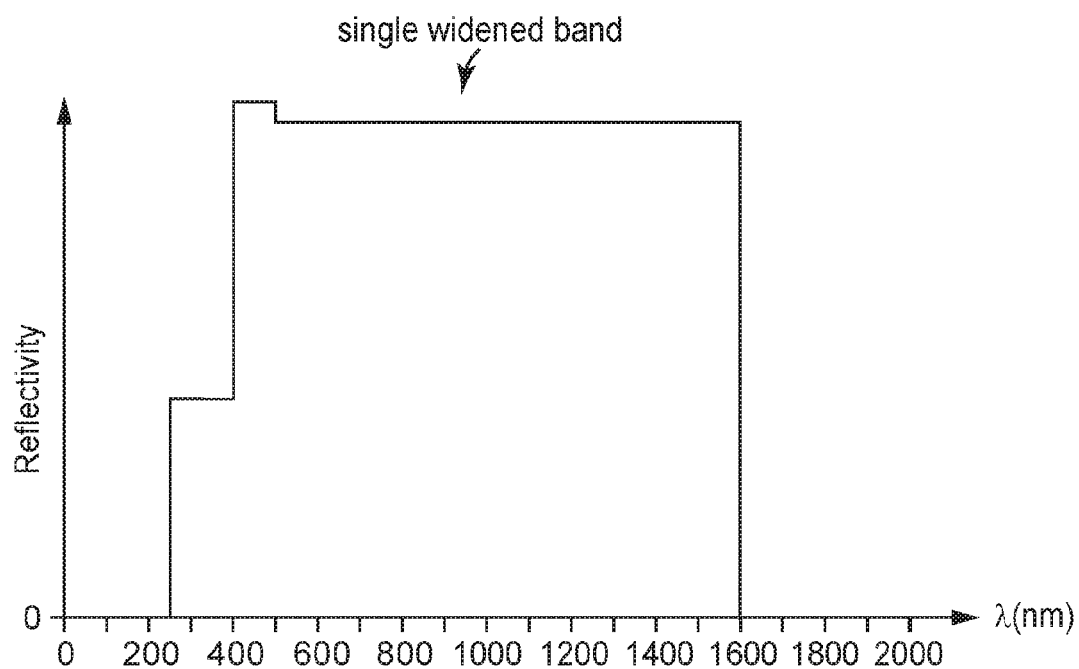
FIG. 9B is an idealized graph similar to FIG. 9A but showing how the overlapping harmonic bands produce a single wide reflection band that covers at least a portion of visible and infrared wavelengths.

As a result of the overlapping $1^{st}$, $2^{nd}$, and $3^{rd}$ harmonic bands, a single wide reflection band is formed that is a combination of at least those three harmonic reflection bands. Such a single wide reflection band, for the same polarization state and the same design angle of incidence, is shown in FIG. 9B. The band is shown to extend from a left band edge of about 266 nm (corresponding to the left band edge of the $3^{rd}$ order band) to a right band edge of about 1600 nm (corresponding to the right band edge of the $1^{st}$ order band). The wide or extended band provides a reflectivity that is relatively constant throughout the infrared and over most of the visible spectrum, except at the blue/violet end of the spectrum near 400 nm, where it is slightly higher from 400-533 nm due to the combination of $2^{nd}$ and $3^{rd}$ orders, and were it is substantially lower from 266-400 nm.

Throughout this document, the left band edge of a given reflection band may alternatively be referred to as a short wavelength band edge, whose wavelength may be designated $\lambda_S$. Similarly, the right band edge of a given reflection band may alternatively be referred to as a long wavelength band edge whose wavelength may be designated $\lambda_L$. An additional subscript is also used herein to designate the harmonic order of a given band, e.g., $1^{st}$ or $2^{nd}$. Thus, for example, $\lambda_{S1st}$ refers to the wavelength of the left band edge of the $1^{st}$ order reflection band, and $\lambda_{L2nd}$ refers to the wavelength of the right band edge of the $2^{nd}$ order reflection band.

In regions of spectral overlap of one reflection band with another, reflectivities combine in an "incoherent" rather than a "coherent" fashion. For example, if one harmonic and has a reflectivity R1 and the other has a reflectivity R2 at the same wavelength, the overall reflectivity R of the stack at that wavelength will be given by the so-called "pile-of-plates" formula, $$R = \frac{R1 + R2 \times (1 - 2R1)}{1 - R1 \times R2},$$

rather than by the simple sum R1+R2. For example, if R1 is 60% and R2 is 30%, the reflectivity R of the combination is given by about 66%, rather than by 90%.

Here, a point of clarification is in order with regard to the effect of air interfaces. An optical film or film body has an outer front or top major surface and an outer back or bottom major surface. Each of these two outer surfaces is typically exposed to air, vacuum, or another inert gas. Unless antireflective coatings are provided, light is reflected at these two outer surfaces regardless of the interior structure or composition of the optical film. When discussing the reflective properties of the film (or a component thereof, such as a microlayer stack), one can either include the effect of the outer surface reflections in the reflectivity values, or one can exclude the effect of those outer surface reflections. A reflectivity value that includes the effect of the outer surface reflections is referred to as "external" reflectivity, and a reflectivity value that does not include the effect of the outer surface reflections is referred to as "internal" reflectivity. Stated differently, the "internal reflectivity" of a film or other body is the reflectivity the film would have in the absence of any interfaces at the front or back (or top or bottom, etc.) of the film due to contact with air or any other medium of different refractive index than the film. "Internal transmission" and "external transmission" are defined in an analogous fashion, but for transmission. For purposes of this document, "reflectivity" and like terms refer to external reflectivity, and "transmission" and like terms refer to external transmission, unless otherwise clearly indicated to the contrary. Thus, for example, in the "pile-of-plates" formula above for the overall reflectivity R in terms of R1 and R2, if R1 and R2 are given in terms of internal reflectivities, then the calculated R will also refer to an internal reflectivity. Alternatively, the "pile-of-plates" formula may be interpreted in such a way that R1 may include the effect of surface reflections at one outer interface, and R2 may include the effect of surface reflections at the opposite outer interface, whereupon R would represent the external reflectivity of the film, i.e., the reflectivity of the film including the effects of light reflecting from both outer surfaces of the film.

The simplicity of the reflection band shapes in FIG. 9A makes the overlapping technique discussed above readily understandable. However, as mentioned above, real reflection bands produced by real stacks of microlayers do not have ideal rectangular shapes; consequently, a determination of whether a given reflection band overlaps another reflection band becomes less straightforward, to the extent a precise wavelength value of the left and right band edges of the reflection bands cannot be readily determined. For this reason, we provide further below a methodology for reliably determining the spectral location of left and right band edges for a given harmonic order reflection band produced by a microlayer stack, which methodology involves both an analysis of the measured or modeled spectral reflectivity, as an analysis of the measured or modeled ORU thickness profile for the stack, and the f-ratio of the stack also being a factor in the analysis.

The fact that real reflection bands produced by real stacks of microlayers do not have ideal rectangular shapes also has ramifications relating to the idea of reflection band overlap. In particular, two reflection bands that do not overlap according to a strict adherence to the methodology herein of determining the location of band edges—e.g., the right band edge as determined herein of the shorter wavelength reflection band may be separated by only a few nanometers from left band edge as determined herein of the longer wavelength reflection band, so that such bands could not be considered to overlap—may nevertheless be close enough together to produce a spectral feature that may reasonably be characterized as a single wide reflection band. To account for such situations, we use the term "substantially overlap" (and related terms such as "substantially overlapping", etc.) to encompass both (a) actual overlap between two reflection bands, as discussed above, and (b) cases in which there is no actual overlap between two nearby band edges of adjacent reflection bands, but where the wavelength of one of the band edges (e.g. $\lambda_{L2nd}$) differs from that of the other band edge (e.g. $\lambda_{S1st}$) by 5% or less of the wavelength of either band edge.

Figure 10A:
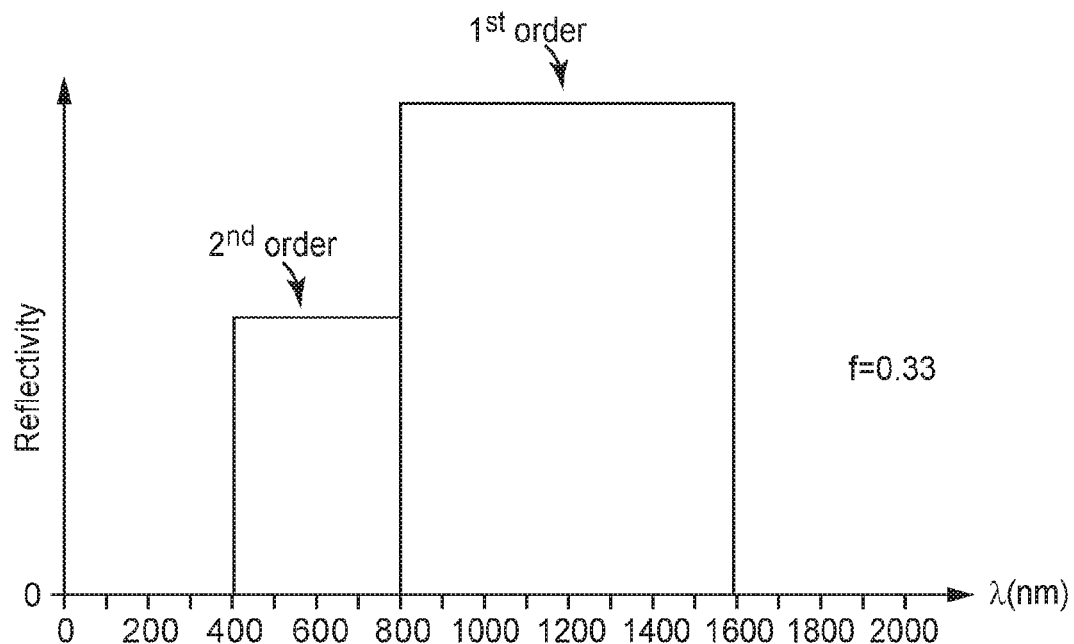
FIG. 10A is an idealized graph similar to that of FIG. 9A, but where the f-ratio of the stack is changed to 0.33 such that the reflectivity of the $2^{nd}$ order reflection band is substantially different from that of the $1^{st}$ order reflection band, and no $3^{rd}$ order reflection band is produced.

FIG. 10A illustrates another case in which the $2^{nd}$ order reflection band is made to overlap at least one of the $1^{st}$ and $3^{rd}$ order reflection bands to produce a single widened reflection band. In brief, a microlayer stack can be made in substantially the same manner as the stack associated with FIG. 9A, except that the f-ratio of all of the ORUs in the stack is changed from 0.25 to 0.33, i.e., ⅓. With reference to FIG. 5A, the modified f-ratio produces a $1^{st}$ and $2^{nd}$ harmonic, but no $3^{rd}$ harmonic. FIG. 5A also reveals that the reflective power of the $2^{nd}$ order, for the f-ratio of ⅓, substantially less than the reflective power of the $1^{st}$ order, rather than being equal to it as in FIG. 9A. Just as in FIG. 9A, the reflection bands shown in FIG. 10A represent the reflectivity of the stack for light of a given polarization state and at a design angle of incidence, such as normal incidence. Also, no scale is provided on the vertical "Reflectivity" axis of FIG. 10A for generality, but the relative heights of the different bands are roughly accurate, insofar as the $2^{nd}$ order band has a substantially lower reflectivity than the $1^{st}$ order band, and no $3^{rd}$ order band exists. The $1^{st}$ order band extends from a left band edge at 800 nm to a right band edge at 1600 nm. The $2^{nd}$ order band extends from a left band edge at 400 nm to a right band edge at 800 nm. No $3^{rd}$ order band exists, and harmonics higher than $3^{rd}$ order are not shown for simplicity. Thus, in this case, the $2^{nd}$ order reflection band (spectrally) overlaps the $1^{st}$ order reflection band.

Figure 10B:
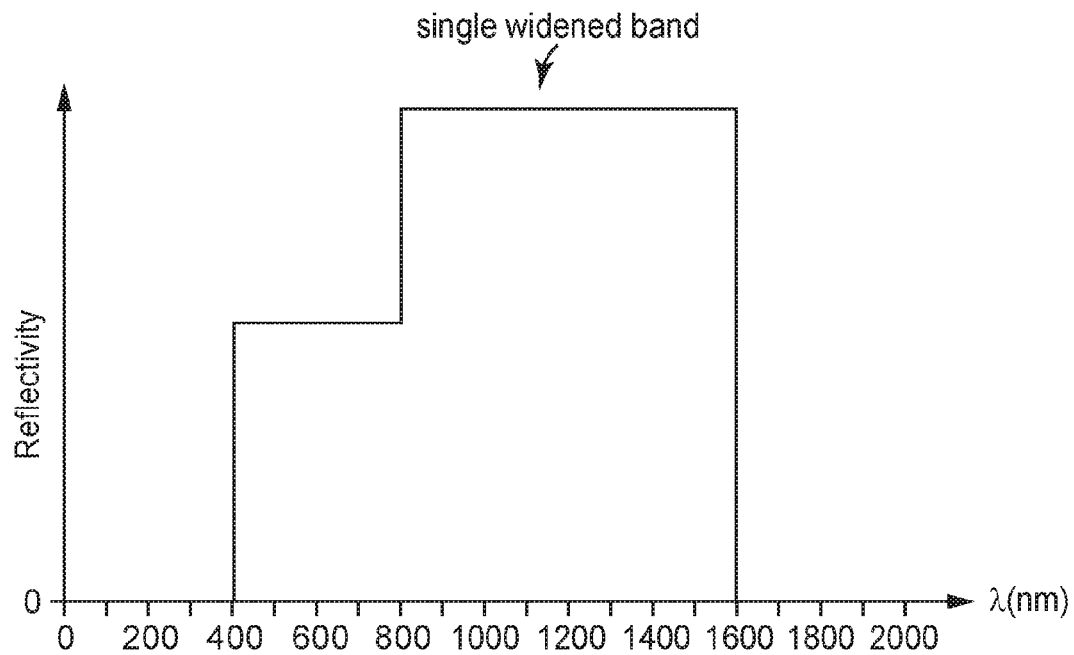
FIG. 10B is an idealized graph similar to FIG. 10A but showing how the overlapping harmonic bands produce a single wide reflection band that covers at least a portion of visible and infrared wavelengths.

As a result of the overlapping $1^{st}$ and $2^{nd}$ order harmonic bands, a single wide reflection band is formed that is a combination of those two harmonic reflection bands. The single wide reflection band is shown in FIG. 10B, which assumes the same polarization state and the same design angle of incidence as FIG. 10A. The band is shown to extend from a left band edge of about 400 nm (corresponding to the left band edge of the $2^{nd}$ order band) to a right band edge of about 1600 nm (corresponding to the right band edge of the $1^{st}$ order band). The wide or extended band provides a reflectivity that is relatively constant over much of the infrared region and also relatively constant, but at a substantially lower level (a substantially different reflectivity), over most of the visible spectrum. That is, the wide reflection band possesses a step change in reflectivity and in transmission. A multilayer optical film with such reflection characteristics may be useful in an application where partial reflection and partial transmission is desired over all or most of the visible spectrum, e.g. to allow people to see things through the film, and where much higher reflectivity is desired over a large portion of the infrared spectrum.

Figure 11A:
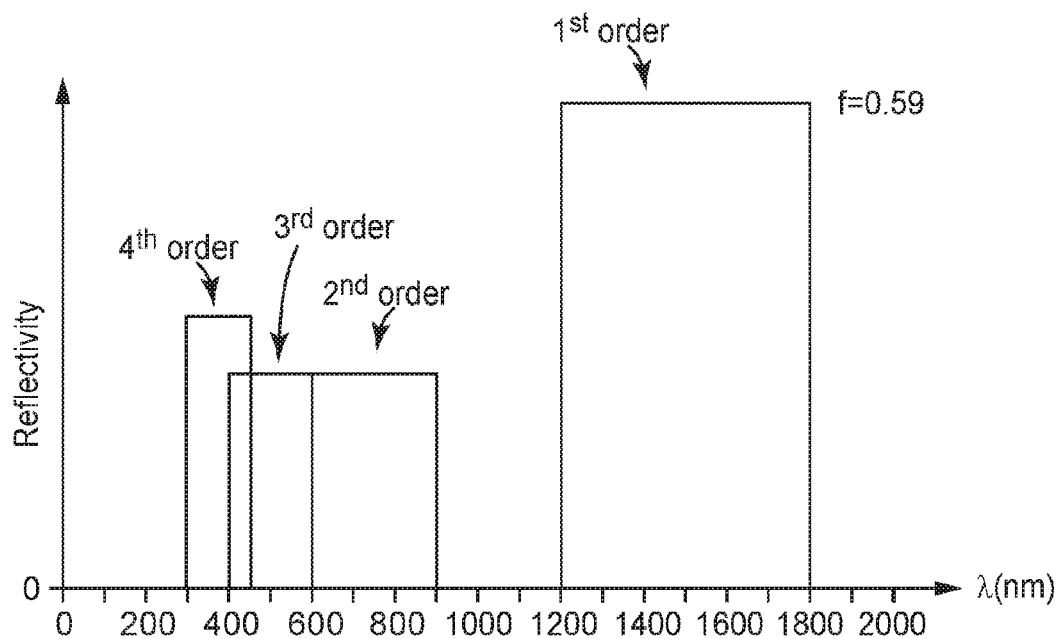
FIG. 11A is an idealized graph similar to that of FIGS. 9A and 10A, but where the stack is assumed to have a different ORU thickness gradient and an f-ratio of 0.59, such that the $2^{nd}$ order reflection band substantially overlaps with the $3^{rd}$ order reflection band but not the $1^{st}$ order reflection band.

FIG. 11A illustrates still another case in which the $2^{nd}$ order reflection band is made to overlap at least one of the $1^{st}$ and $3^{rd}$ order reflection bands to produce a single widened reflection band. In brief, a microlayer stack is tailored so that the stack provides a number of harmonic reflection bands. The ORU thickness gradient of the stack covers a range of optical thicknesses so that the $1^{st}$, $2^{nd}$, and $3^{rd}$ order reflection bands (and a $4^{th}$ order reflection band) are as shown in the figure, assuming light of a given polarization state and at a design angle of incidence, such as normal incidence. The f-ratio of the microlayer stack is 0.59. With reference to FIG. 5A, this f-ratio produces a $1^{st}$, $2^{nd}$, $3^{rd}$, and $4^{th}$ harmonic, with the reflective power of the $2^{nd}$ order being the same as that of the $3^{rd}$ order, and the $4^{th}$ order having a slightly higher reflective power, and the $1^{st}$ order having the highest reflective power. No scale is provided on the vertical "Reflectivity" axis of FIG. 11A for generality, but the relative heights of the different bands are roughly accurate. The $1^{st}$ order band extends from a left band edge at 1200 nm to a right band edge at 1800 nm. The $2^{nd}$ order band extends from a left band and edge at 600 nm to a right band edge at 900 nm. The $3^{rd}$ order band extends from a left band edge at 400 nm to a right band edge at 600 nm. The $4^{th}$ order band extends from a left band edge at 300 nm to a right band edge at 450 nm. Harmonics higher than $4^{th}$ order are not shown for simplicity. Thus, in this case, the $2^{nd}$ order reflection band (spectrally) overlaps the $3^{rd}$ order reflection band, but does not overlap or even substantially overlap the $1^{st}$ order reflection band.

Figure 11B:
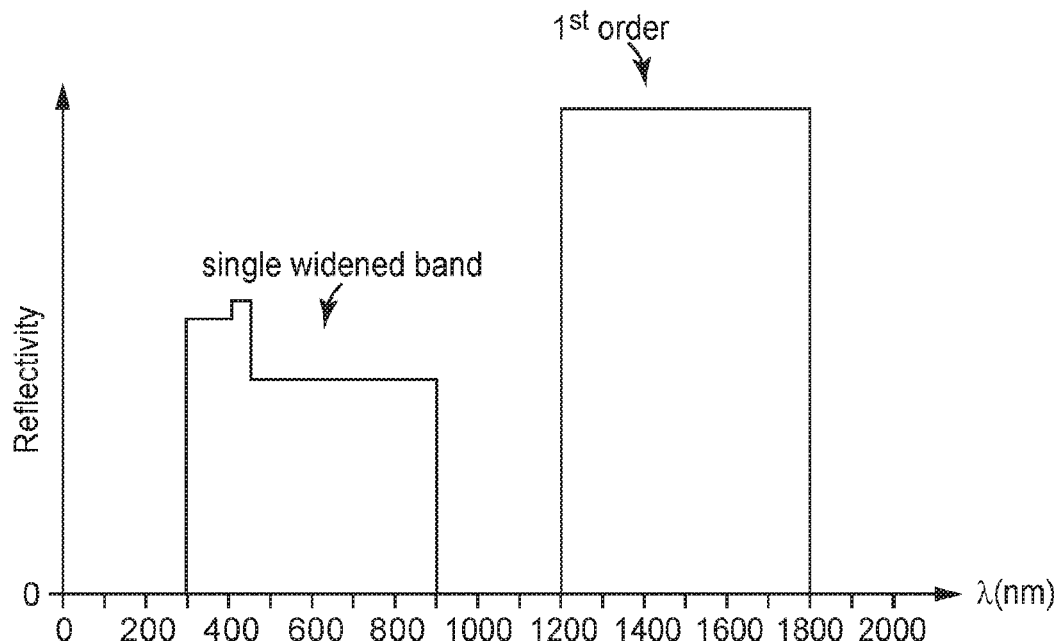
FIG. 11B is an idealized graph similar to FIG. 11A but showing how the overlapping $2^{nd}$ and $3^{rd}$ order reflection bands (as well as the $4^{th}$ order reflection band) produce a single wide reflection band that covers at least a portion of visible and infrared wavelengths.

As a result of the overlapping $2^{nd}$ and $3^{rd}$ order harmonic bands (as well as the overlapping $3^{rd}$ and $4^{th}$ order bands), a single wide reflection band is formed that is a combination of at least those two harmonic reflection bands. The single wide reflection band is shown in FIG. 11B, which assumes the same polarization state and the same design angle of incidence as FIG. 11A. The band is shown to extend from a left band edge of about 300 nm (corresponding to the left band edge of the $4^{th}$ order band) to a right band edge of about 900 nm (corresponding to the right band edge of the $2^{nd}$ order band). The wide or extended band provides a reflectivity that is relatively constant over a portion of the infrared region and most of the visible spectrum, except at the blue/violet end of the spectrum below 450 nm, where it increases due to the presence of the $4^{th}$ order band. Due to the fact that the $2^{nd}$ order band does not overlap or substantially overlap with the $1^{st}$ order band in this embodiment, a pass band is formed between these two bands, and the microlayer stack provides the $1^{st}$ order reflection band in a portion of the infrared spectrum that is distinct from the wide or extended band.

Figure 12:
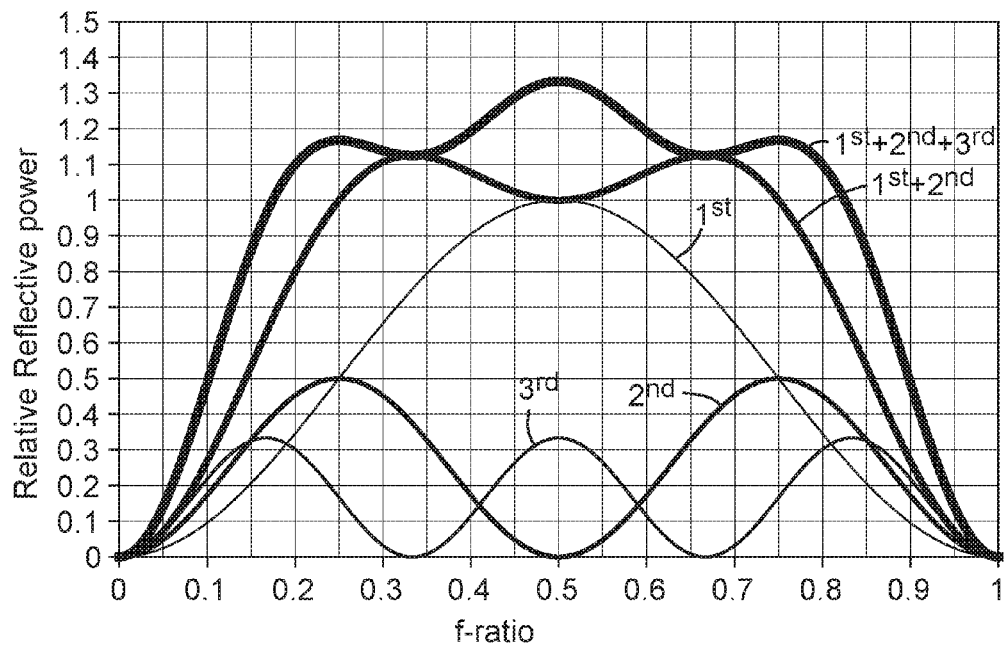
FIG. 12 is a graph of relative reflective power versus f-ratio similar to that of FIG. 5A, but including additional curves that show how the relative reflective power can be enhanced by using combinations of harmonic reflection bands, such as the $1^{st}$ and $2^{nd}$ order reflection bands, or the $1^{st}$, $2^{nd}$, and $3^{rd}$ order reflection bands.

Having now described several simplified embodiments in connection with FIGS. 9A-B (f-ratio 0.25), 10A-B (f-ratio 0.33), and 11A-B (f-ratio 0.59), we see that by combining the $2^{nd}$ order reflection band with the $1^{st}$ and/or $3^{rd}$ order reflection bands (and optionally with even higher order overlapping reflection bands) into a single wide reflection band, the efficiency of the microlayer stack can be enhanced. The wide reflection band in FIG. 9B comprises overlapping $1^{st}$, $2^{nd}$ and $3^{rd}$ order reflection bands; the wide reflection band in FIG. 10B comprises overlapping $1^{st}$ and $2^{nd}$ order reflection bands; and the wide reflection band in FIG. 11B comprises overlapping $2^{nd}$, $3^{rd}$ and $4^{th}$ order reflection bands. Efficiencies created by certain combinations of harmonic orders are depicted graphically in FIG. 12. That figure plots relative reflective power as a function of f-ratio, just as in FIG. 5A, but includes only the $1^{st}$ (m=1), $2^{nd}$ (m=2), and $3^{rd}$ (m=3) order curves. FIG. 12 however also includes two additional curves, namely, one which is the sum of the relative reflective powers of the $1^{st}$ and $2^{nd}$ orders ("$1^{st}$+$2^{nd}$"), and another which is the sum of the relative reflective powers of the $1^{st}$, $2^{nd}$, and $3^{rd}$ orders ("$1^{st}$+$2^{nd}$+$3^{rd}$"). With regard to efficiency, note that these two summation curves provide greater reflective power, over certain ranges of f-ratio values, than the maximum reflected power provided by the $1^{st}$ order reflection band alone. For example, over the f-ratio range from 0.25 to 0.75, the "$1^{st}$+$2^{nd}$" curve provides reflective power that is equal to (at the f-ratio values of 0.25, 0.5, and 0.75) or greater than (at f-ratio values between 0.25 and 0.5, and between 0.5 and 0.75) the maximum reflective power provided by the $1^{st}$ order curve alone. And over the f-ratio range from about 0.175 to 0.825, the "$1^{st}$+$2^{nd}$+$3^{rd}$" curve provides reflective power that is equal to (at the endpoints) or greater than the maximum reflective power provided by the $1^{st}$ order curve alone. Stated more generally, the total useful reflective power of a given microlayer stack is the sum of all the harmonic orders that reflect in the desired wavelength range of interest for the stack, forming a single widened reflection band, and this sum can be greater than the maximum reflective power provided by the 1st order reflection band alone (at f=0.5). By harnessing the reflective power of $2^{nd}$ order reflections in combination with at least $1^{st}$ and/or $3^{rd}$ order reflections, an article that utilizes the overlapping harmonic band technique can provide enhanced reflective efficiency for a given number of microlayers and a given refractive index difference between microlayers.

In addition to potential gains in efficiency that can be seen from FIG. 12, other benefits can sometimes also be realized by using the harmonic band overlapping technique. Such other potential benefits may include reduced material costs, the ability to provide sharp step changes in reflectivity, and ease of manufacture.

With regard to reduced material costs, the f-ratio of the microlayer stack is adjusted to be a value other than 50% in order to excite the $2^{nd}$ order harmonic band. By selecting the f-ratio in this way, each ORU within the stack is made of less "A" material and more "B" material (or vice versa) compared to a quarter wave stack having a 50% f-ratio. This situation can then be exploited in cases where the "A" and "B" materials (e.g. different transparent polymers) have substantially different costs. In particular, the f-ratio can be strategically chosen to minimize the material content of the more expensive material in the microlayer stack, while still achieving the desired reflectivity and band width.

With regard to step changes in reflectivity, when designers and manufactures of polymeric multilayer optical films face the challenge of providing a continuous reflection band with a step change in reflectivity, such a challenge can be difficult to solve when using only the $1^{st}$ order reflections of a single stack of microlayers, because such a solution would typically require a sharp change in the slope of the ORU thickness profile. The present document illustrates how such a step change can be provided by a single stack of microlayers by tailoring the stack to have overlapping harmonics. These overlapping harmonics can be controlled to provide substantially different levels of reflectivity, with abrupt step-like transitions, in a single continuous reflection band, without the need to provide a sharp change in the slope of the ORU thickness profile. Refer e.g. to FIGS. 9A-B, 10A-B, and 11A-B above, as well as FIGS. 16A-C below. In some cases the step change in reflectivity is aided by using overlapping harmonic reflection bands having substantially different reflectivities or reflective powers.

With regard to ease of manufacture, when designers and manufacturers of polymeric multilayer optical films face the challenge of providing a very wide continuous reflection band, such a challenge can be difficult to solve when using only the $1^{st}$ order reflections of a single stack of microlayers, because such a solution may require an excessively large thickness range across the microlayer stack. For example, a microlayer stack designed to reflect light from 400 to 1600 nm, using only $1^{st}$ order reflections, would require an ORU thickness profile in which the thickest ORU is 4 times the thickness of the thinnest ORU. However, when the same continuous wide reflection band is produced with a combination of both $1^{st}$ and $2^{nd}$ order reflections, e.g. as shown in FIGS. 10A or 9A, a less drastic taper of the ORU thickness profile can be used, in which the thickest ORU is only 2 times the thickness of the thinnest ORU. Reference in this regard is also made to FIGS. 15A-C below.

Another consideration relating to ease of manufacture involves challenges in making microlayers that are thin enough to reflect light at short wavelengths, e.g. in the blue/violet portion of the visible spectrum near 400 nm or below, or at wavelengths in the near UV wavelength region. For multilayer optical films that are made by the coextrusion of alternating layers of molten polymer materials, problems with flow instability of the molten state polymers can become significant as the extruded layers are made thinner and thinner. For example, if the desired polymer "A" and "B" materials do not have well matched rheologies, "layer breakup" can result. The technique of using overlapping harmonics described herein can help alleviate such problems because, by using higher order harmonics such as $2^{nd}$ or $3^{rd}$ orders to provide the desired reflectivity at the shorter wavelengths (e.g. the visible blue/violet and/or near UV wavelength region), the molten polymer layers can be made much thicker (2 times thicker for the $2^{nd}$ order, or 3 times thicker for the $3^{rd}$ order, etc.) than the thickness needed when working with a $1^{st}$ order reflection band.

MODELED EXAMPLES

We will now discuss certain specific multilayer optical film embodiments that we designed and modeled, using optical design software, to demonstrate in a more realistic way the overlapping harmonic concepts discussed herein.

Figure 13:
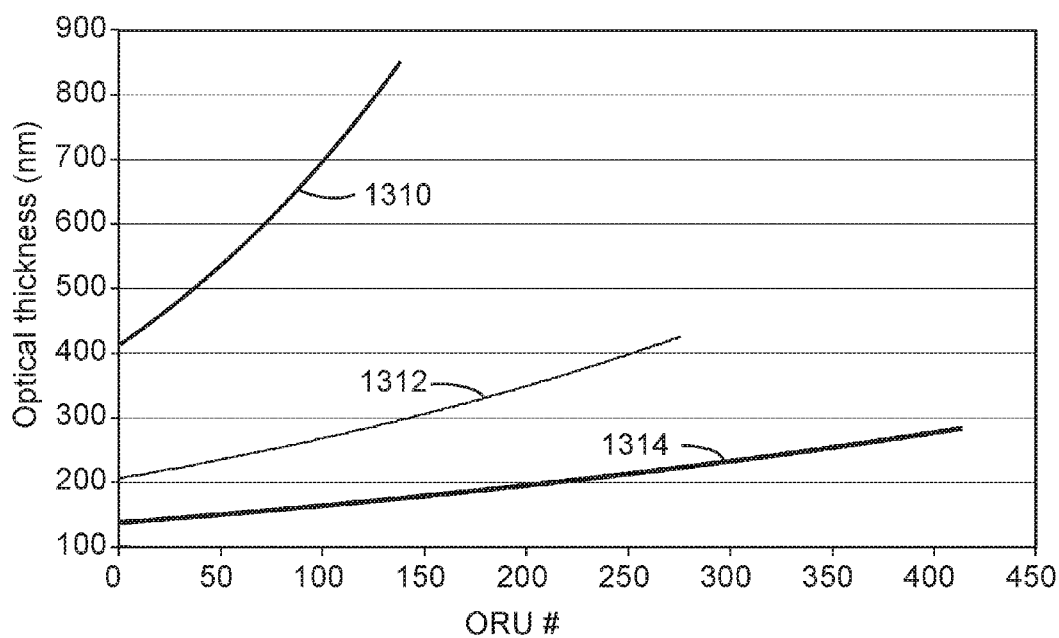
FIG. 13 is a layer thickness profile graph for a first microlayer stack that was modeled, the first stack having an f-ratio of 0.25, the graph containing one curve representing the optical thickness of the ORUs within the stack, and related curves that can be used to determine which portion of the overall reflectivity of the stack is due to the various higher order harmonics.
Figure 14A:
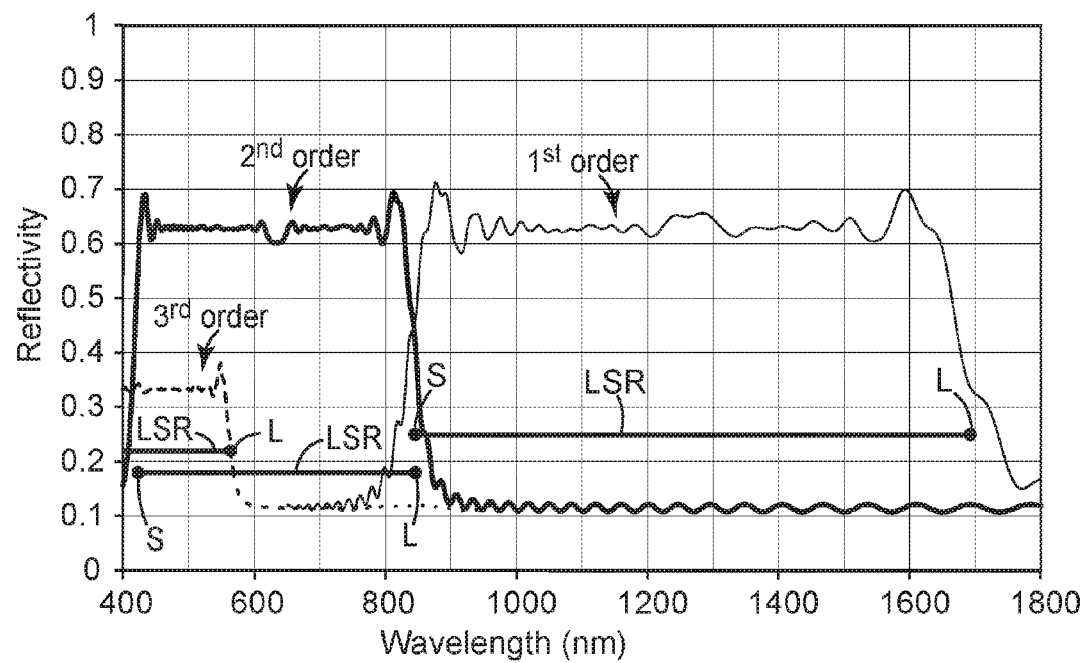
FIG. 14A is a graph of the calculated or modeled spectral reflectivity of the first microlayer stack, where a methodology is used to separately plot and identify the $1^{st}$, $2^{nd}$, and $3^{rd}$ order reflection bands produced by the first microlayer stack.
Figure 14B:
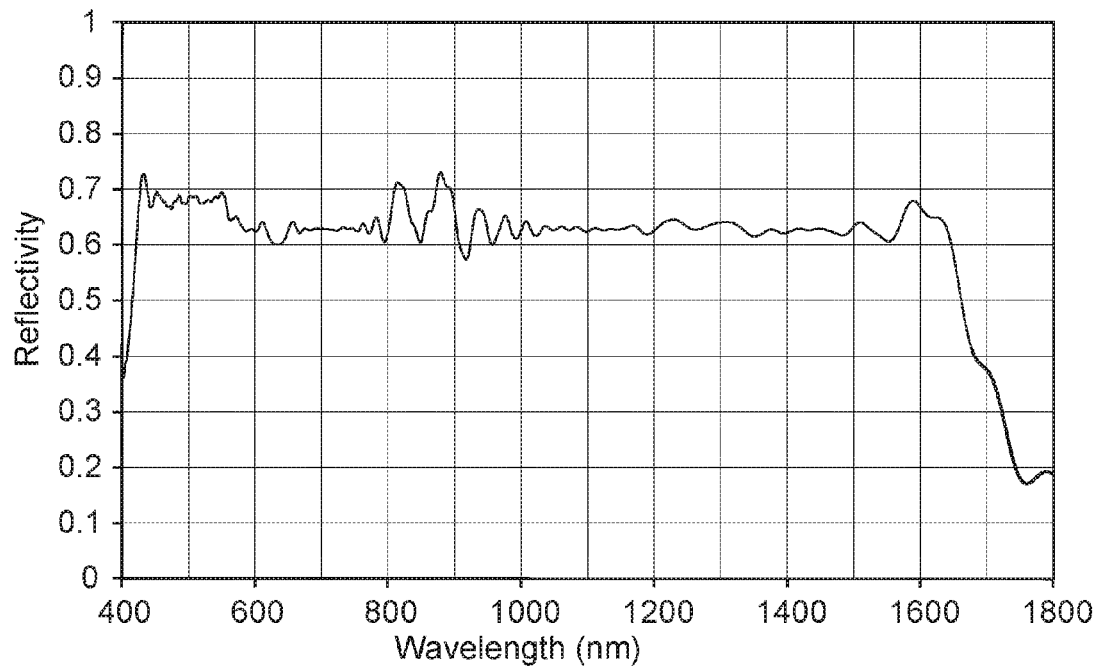
FIG. 14B is a graph of the calculated or modeled overall spectral reflectivity of the first microlayer stack, without regard to separate harmonic identification.
Figure 15A:
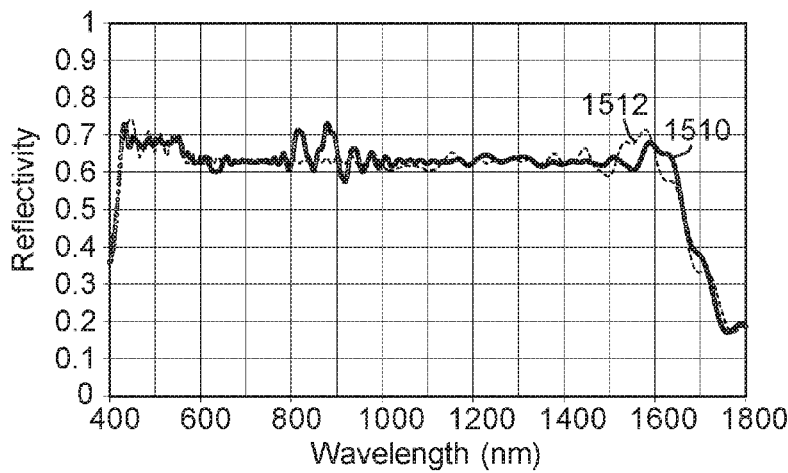
FIG. 15A is a graph that compares the modeled spectral reflectivity of the first microlayer stack with that of a first comparative microlayer stack in which the reflection band has no significant $2^{nd}$ order component and is produced almost exclusively by a $1^{st}$ order harmonic.
Figure 15B:
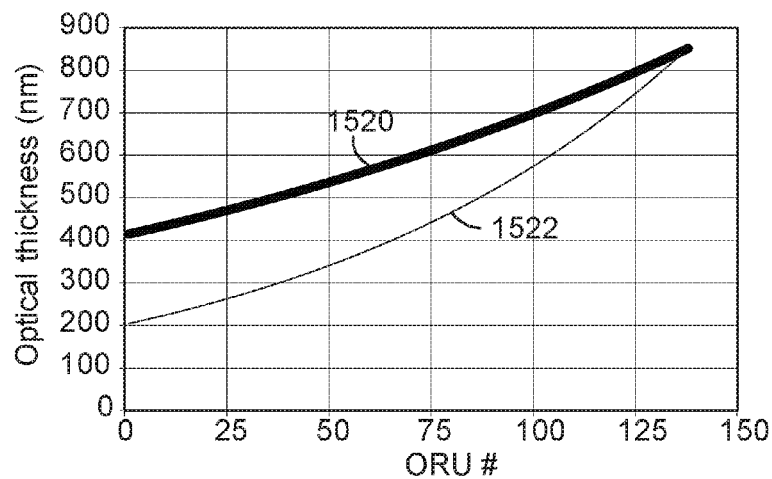
FIG. 15B is a layer thickness profile graph that compares the ORU thickness profile of the first microlayer stack with that of the first comparative microlayer stack.
Figure 15C:
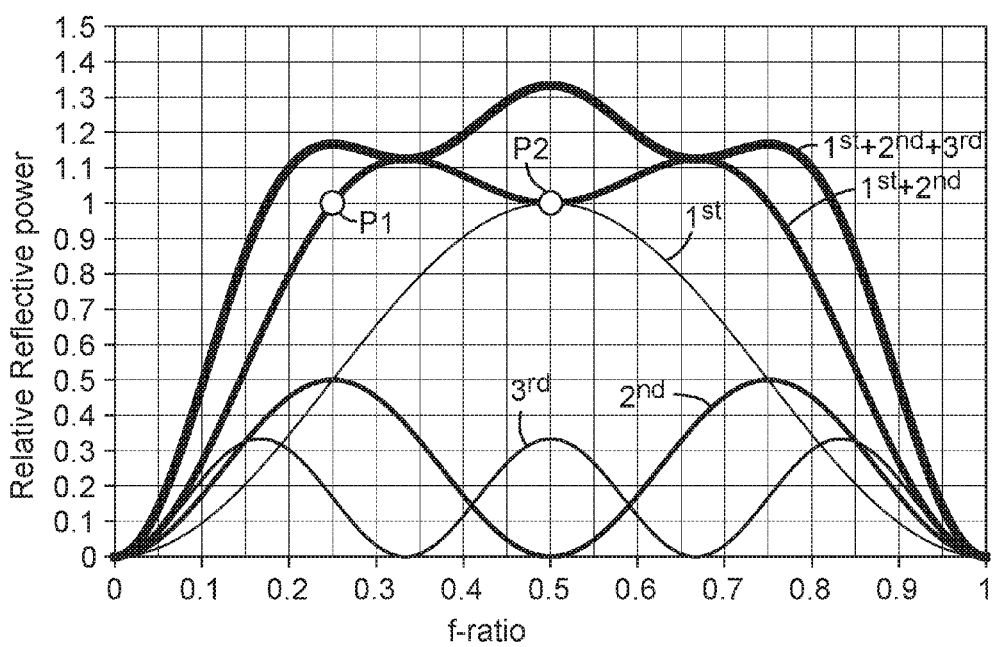
FIG. 15C is substantially the same as FIG. 12, except that two points are plotted representing the operation of the first microlayer stack and the first comparative microlayer stack.
Figure 16A:
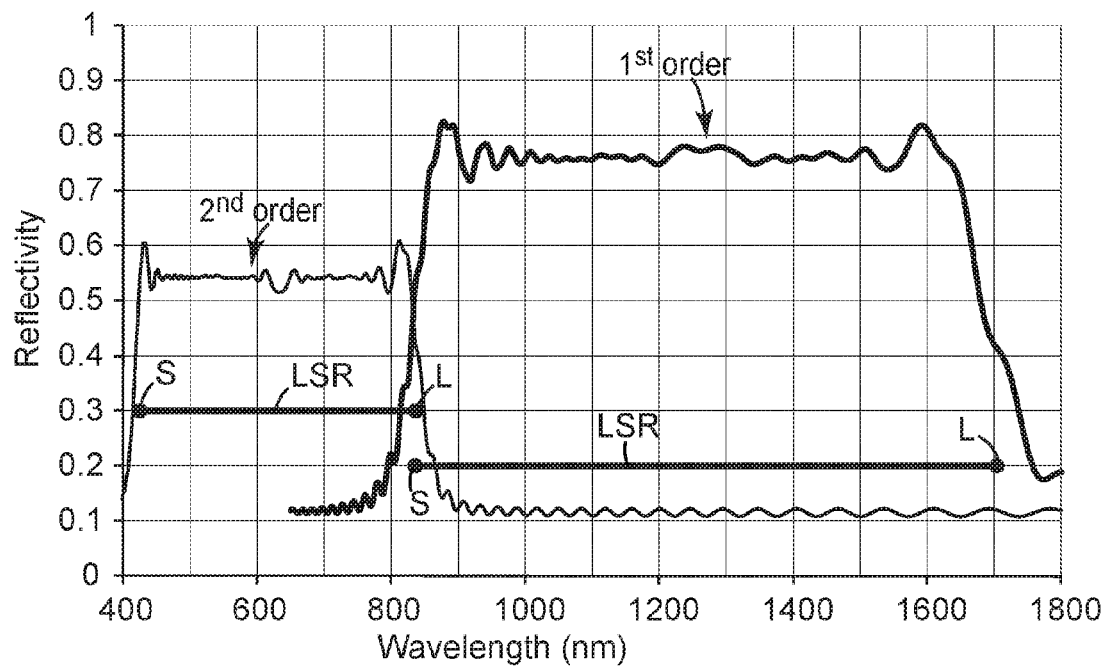
FIG. 16A is a graph of the calculated or modeled spectral reflectivity of a second modeled microlayer stack, the second modeled stack being similar to the first modeled stack but having an f-ratio of 0.33, and where our methodology is used to separately plot and identify the $1^{st}$ and $2^{nd}$ order reflection bands produced by the second modeled stack.
Figure 16B:
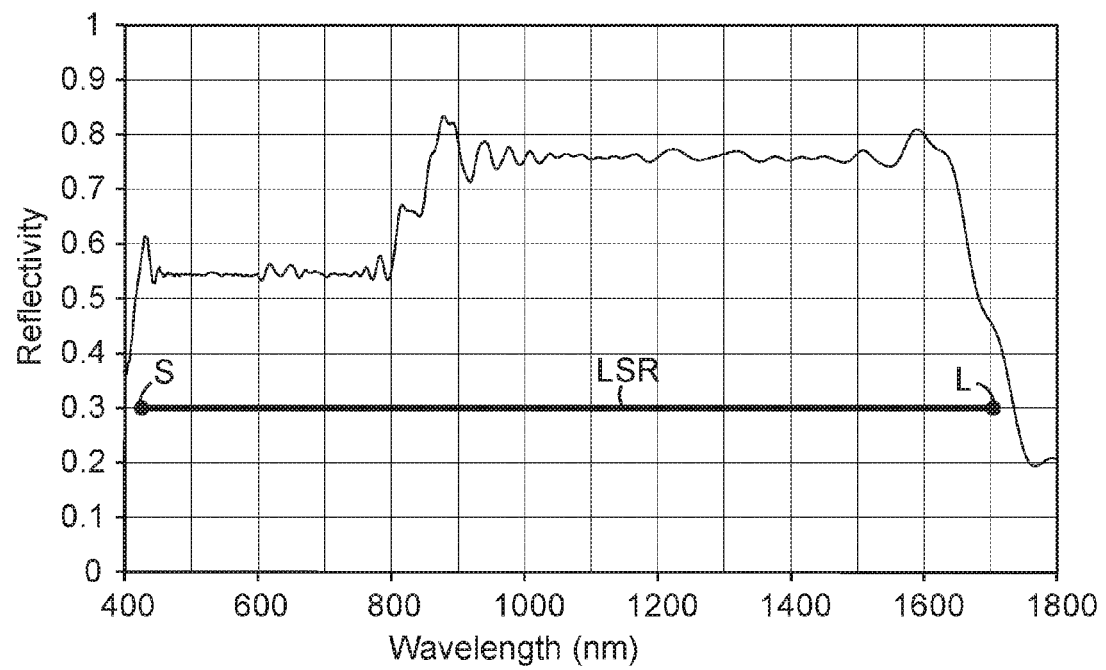
FIG. 16B is a graph of the calculated or modeled overall spectral reflectivity of the second modeled stack, without regard to separate harmonic identification.
Figure 16C:
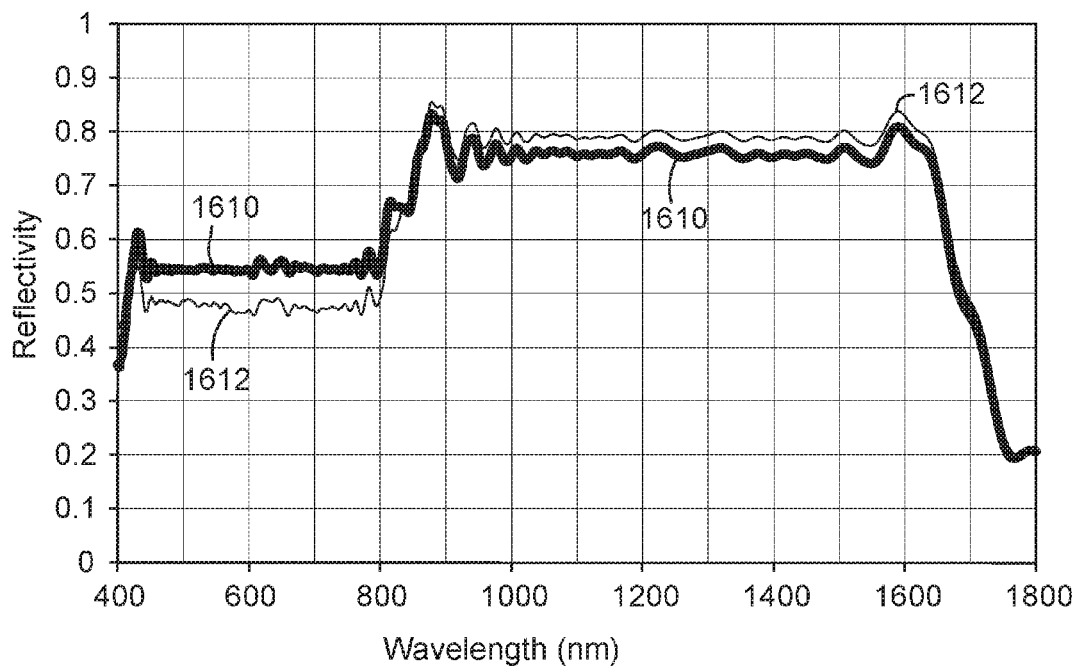
FIG. 16C is a graph similar to FIG. 16B, but showing how the calculated or modeled overall spectral reflectivity of the second modeled stack changes if the f-ratio is changed from 0.33 to 0.36.
Figure 17:
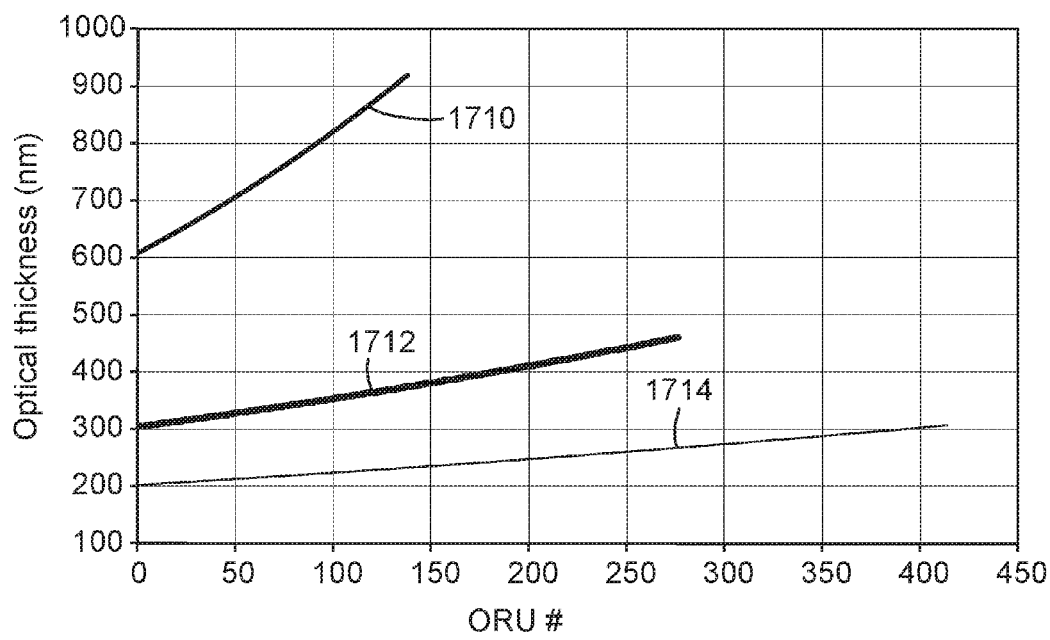
FIG. 17 is a layer thickness profile graph for a third microlayer stack that was modeled, the third modeled stack having an f-ratio of 0.59, the graph containing one curve representing the optical thickness of the ORUs within the stack, and related curves that can be used to determine which portion of the overall reflectivity of the stack is due to the various higher order harmonics.
Figure 18A:
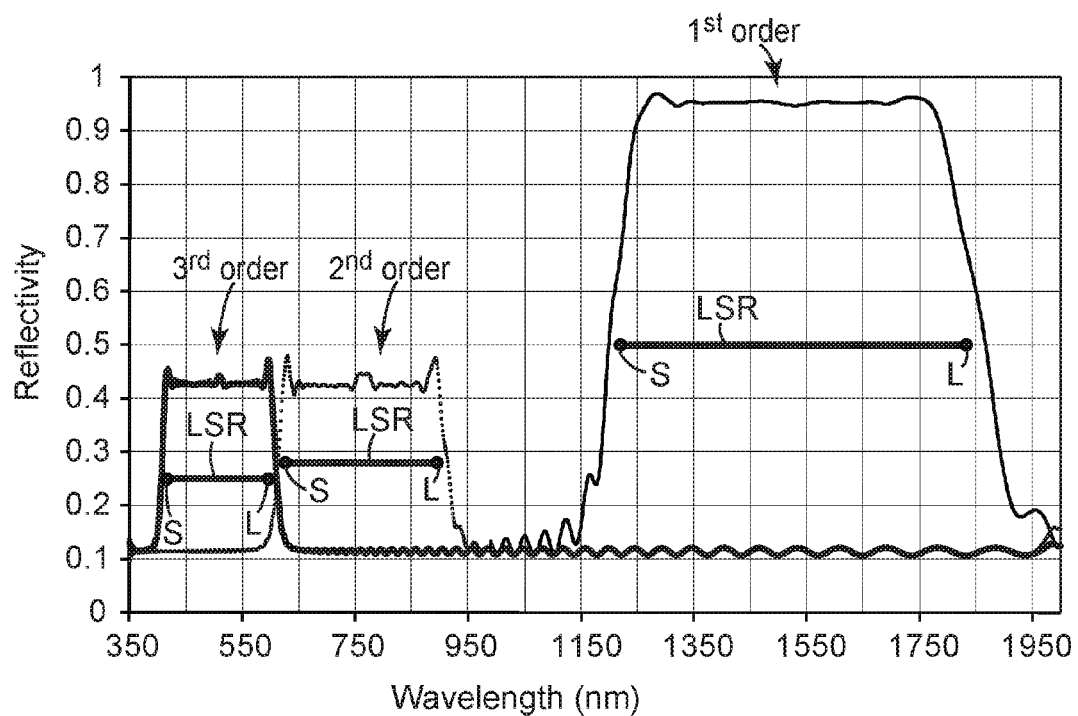
FIG. 18A is a graph of the calculated or modeled spectral reflectivity of the third modeled stack, where our methodology is used to separately plot and identify the $1^{st}$, $2^{nd}$, and $3^{rd}$ order reflection bands produced by the third modeled stack.
Figure 18B:
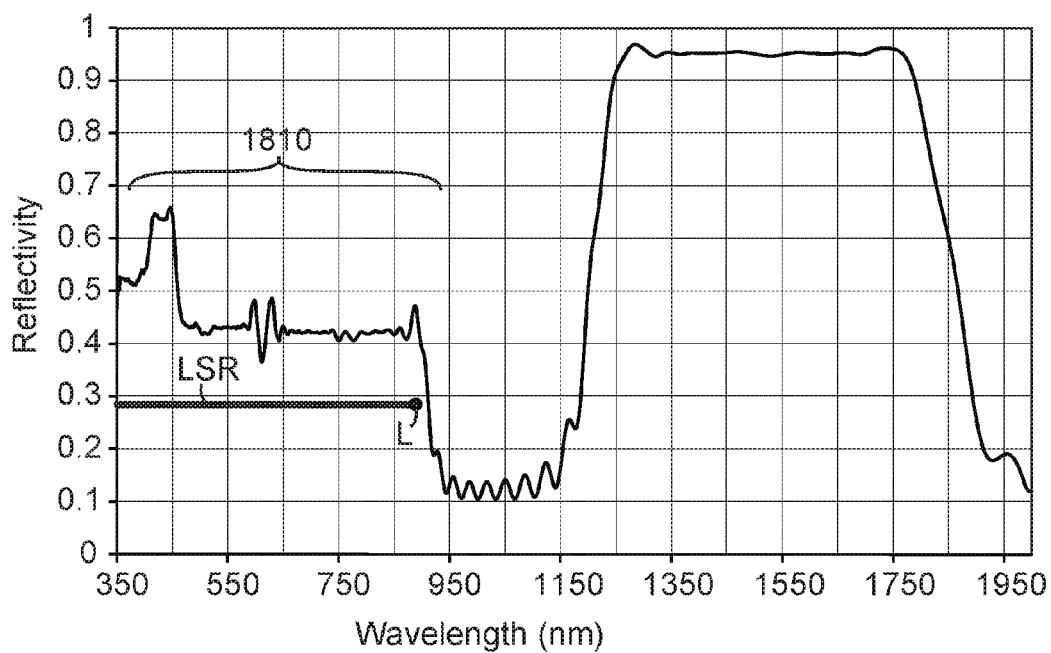
FIG. 18B is a graph of the calculated or modeled overall spectral reflectivity of the third modeled stack, without regard to separate harmonic identification.

In brief, a first modeled microlayer stack was tailored to provide overlapping 1$^{st}$, 2$^{nd}$, and 3$^{rd}$ order reflection bands in a manner similar to FIG. 9A above. This first modeled stack used 276 individual microlayers arranged into 138 ORUs with a graded ORU thickness profile, and an f-ratio of 0.25. FIGS. 13, 14A, and 14B relate to the first modeled stack. FIGS. 15A, 15B, and 15C relate to a comparison of the first modeled stack to a first comparative microlayer stack, whose relevant reflection band has no 2$^{nd}$ order component and is produced almost exclusively by a 1$^{st}$ order harmonic. A second modeled microlayer stack was tailored to provide overlapping 1$^{st}$ and 2$^{nd}$ order reflection bands in a manner similar to FIG. 10A above. This second modeled stack used the same number of microlayers and ORUs as the first modeled stack, and it also used the same graded ORU thickness profile; however, the f-ratio was changed to 0.33. FIGS. 13, 16A, and 16B relate to the second modeled stack. FIG. 16C relates to a modification of the second modeled stack in which the f-ratio is changed from 0.33 to 0.36 to provide a greater difference in reflectivity between the 1$^{st}$ and 2$^{nd}$ order reflection bands, and thus a larger step change in the reflection spectrum of the overall widened reflection band. A third modeled microlayer stack was tailored to provide overlapping 2$^{nd}$, 3$^{rd}$, and 4$^{th}$ order reflection bands in a manner similar to FIG. 11A above. This third modeled stack used the same number of microlayers and ORUs as the first and second modeled stacks, but it used a different graded ORU thickness profile. Furthermore, the f-ratio was changed to 0.59. FIGS. 17, 18A, and 18B relate to the third modeled stack. Lastly, FIGS. 19 through 21 relate to a second comparative microlayer stack, whose 2$^{nd}$ order reflection band does not overlap or substantially overlap with either the 1$^{st}$ or 3$^{rd}$ order reflection band of the stack.

In connection with these modeled examples, we also discuss methodologies we have developed in order to analyze a given microlayer stack to determine if it embodies the overlapping harmonic characteristics discussed herein. A first methodology, referred to as a harmonic analysis methodology, allows us to determine which portions of the spectral reflectivity of the stack are due to which harmonic orders, and to determine what the spectral reflectivity is for each relevant harmonic order of the stack. This first methodology allows us to isolate each relevant harmonic reflection band of the stack, e.g., to separately calculate and plot the 1$^{st}$ order reflection band of the stack, and the 2$^{nd}$ order reflection band of the stack, and so forth. A second methodology, referred to as a bandwidth analysis methodology, allows us to determine in a methodical and repeatable way the wavelength values of the left and right band edges of any given reflection band. This second methodology thus allows us to repeatably and unambiguously determine if two given reflection bands overlap or substantially overlap, as discussed above.

Harmonic Analysis Methodology

As mentioned above, this harmonic analysis methodology allows us to determine which portions of the spectral reflectivity of a given stack of microlayers are due to which harmonic orders, and to determine what the spectral reflectivity is for each relevant harmonic order of the stack. In order to carry out this methodology, it is assumed that one knows, or can measure or otherwise determine, the ORU thickness profile, the f-ratio of the stack, and the actual refractive indices of the microlayers.

Multilayer polymer reflectors typically are made with many ¼ wave thick microlayers. More precisely, they are made with many repeating pairs of high and low index ($n_H$ and $n_L$) polymeric materials that form ½ wave thick Optical Repeating Units (ORUs). The alternating microlayers in polymeric stacks typically have a relatively low index difference compared to those of common inorganic vapor deposited dielectric stacks, and therefore polymeric stacks typically require many more microlayers to obtain comparably high reflectivities. The required large number of repeating microlayers allows the alternating high and low index layers to be represented by a refractive index waveform ("index waveform") which can be evaluated using a Fourier representation of the index waveform. A microlayer stack of ¼ wave thick layers having abrupt boundaries forms a square index waveform. If the f-ratio of such a stack is made to be a value other than 0.5, the layers form waveform that we refer to as an asymmetric square index waveform. We have found that any arbitrarily shaped repeating index waveform can be represented by simple square waveforms of ¼ wave layers by using "effective indices" for the high and low index materials of an ORU. As discussed above, the ORUs may be formed with a continuously varying index of refraction as a function of distance in the film.

The Fourier analysis is valid for systems that do not have abrupt boundaries between microlayers. All that is needed are the Fourier coefficients that are used to represent the index waveform as a sum of individual sine waves which represent the various harmonic frequencies, and whose index amplitudes are determined by the Fourier coefficients $c_m$. Individual harmonic bands can still be calculated for them using a layer profile of a square wave, but with the modified (effective) indices. We have also discovered that when the stack of ORUs is graded in thickness so as widen the reflection band, the Fourier evaluation is still valid.

A multilayer stack calculation that uses the actual microlayer thickness and refractive index values will yield a reflectivity spectrum that, in general, may be a composite or combination of several overlapping harmonic bands, with an unknown contribution from each harmonic order. In order to simulate the response or contribution of any individual harmonic order of interest to the reflectivity of the original microlayer stack, we have found that one can use a different set of effective indices, which is specific to the harmonic order of interest and is based on the known f-ratio of the stack and the actual refractive index difference, and a different effective number of ORUs, which is specific to the harmonic order of interest. This Fourier representation is particularly useful for analyzing complex repeating index waveforms and the reflection bands from each harmonic order.

The examples described below involve microlayer stacks that are asymmetric, i.e., one microlayer in each ORU is less than a ¼ wave thick, and the other microlayer in each ORU is greater than a ¼ wave thick. Stated differently, the examples described below involve microlayer stacks whose f-ratio is different from 0.5. Such asymmetric stacks are referred to here as "asymmetric square wave stacks". Asymmetric stacks can be contrasted with symmetric stacks, which have an f-ratio of 0.5, wherein both the high and the low refractive index materials are ¼ wave thick. As discussed above, the f-ratio, sometimes abbreviated here as "f", is given by $f=d_H*n_H/(d_H*n_H+d_L*n_L)$, where d is the physical thickness of a given microlayer. The reflectivity of asymmetric square wave stacks, in particular the reflectivity of any single harmonic order of interest, can be modeled by using an "effective stack" of ¼ wave microlayers whose effective indices are calculated from the Fourier coefficient for the harmonic order of interest, of the original asymmetric square wave stack. For the given harmonic order of interest, the number of ORUs in the effective stack is an integer multiple of the number of ORUs in the original stack, where the integer multiple is "m", i.e., the order number of the harmonic order of interest. Thus, if the original microlayer stack has N ORUs, the effective stack that we use to calculate the reflectivity of the mth harmonic order has m*N ORUs. In this manner, the various harmonic reflection bands of a given stack of microlayers can be separately identified by performing individual reflectivity calculations for each effective stack associated with each harmonic order of interest.

The effective index differential of an effective stack for the Fourier analysis is given by the peak-to-peak index differential of the original stack times the Fourier coefficient $c_m$ of the stack index profile, i.e. of the stack waveform. The Fourier coefficients $c_m$ are discussed above in connection with FIG. 5A, where we showed they can be calculated as follows:

$$c_m = \left(\frac{4}{m\pi}\right)|\mathrm{Sin}(m\pi f)|,$$

where m is the harmonic order number and f is the f-ratio of the original stack. The (normalized) $c_m$ values are plotted above in FIG. 5B, where in that figure we have normalized by multiplying the $c_m$ values by $\pi/4$. With this information, one can then represent any order reflection band of any asymmetric square wave stack as a symmetric "effective stack" (whose f-ratio is 0.5) that has an effective index differential $\Delta n_{\mathit{eff}}$ given by:

$$\Delta n_{\mathit{eff}} = c_m(n_H - n_L)\pi/4,$$

where $n_H$ and $n_L$ are the actual layer indices of refraction of the high and low index materials of the microlayers, and $c_m$ is the Fourier coefficient for the harmonic order of interest (m) as calculated for the f-ratio of the original stack. The Fourier coefficients plotted in FIG. 5B assume abrupt transitions between adjacent microlayers in the stack; if the transitions are gradual rather than abrupt, the correct Fourier coefficients will deviate to some extent from those plotted in FIG. 5B. In such cases the actual refractive index waveform should be determined, and the Fourier coefficients can be calculated using the known methods for the Fourier series representation of a periodic function. See e.g. CRC Standard Mathematical Tables, 18$^{th}$ edition, page 458. After determining $\Delta n_{\mathit{eff}}$ using the above equation, the effective refractive indices to be used for the microlayers of the effective stack can be readily determined by requiring their average refractive index to be the same as that of the original stack.

If the original stack of microlayers has N ORUs (2N microlayers), the reflection band for a given harmonic order m of interest is calculated using the effective stack for that order m and any standard multilayer computer stack software program, where the refractive indices to be used for the effective stack are as described above in connection with the equation for $\Delta n_{\mathit{eff}}$. The effective stack will have m*N optical repeat units. The optical thicknesses of the ORUs in the effective stack are 1/m times the thicknesses of the ORUs of the original stack, with m times as many ORUs in the layer profile. Thus, in performing the calculation for the reflectivity of the given harmonic order m of interest, the effective stack is obtained by replacing each ORU in the original stack with m ORUs, each of which is 1/m times as thick as the corresponding ORU in the original stack. Examples are given below.

Bandwidth-Analysis Methodology

The resonant wavelength of an ORU is the wavelength at which the combination of layer thicknesses and refractive index value leads to constructive interference of an incident light wave, causing the ORU to be partially reflective to the incident light. The resonant wavelength of an optical repeat unit (ORU), for its m$^{th}$ order reflection harmonic is $$\lambda_{0,m} = (2/m) \times (d_H n_H + d_L n_L),$$

where m is the reflection harmonic order, $d_H$ and $d_L$ are the layer thickness of the higher-value refractive index material (material A), and the lower-valued refractive index material (material B) respectively, and $n_H$ and $n_L$ are the refractive index values of material A and material B.

The term $(d_H n_H + d_L n_L)$ is the optical thickness of the ORU, and inspection of the above equation indicates that the 1$^{st}$ order reflection harmonic occurs at twice the optical thickness of the ORU, the 2$^{nd}$ order reflection harmonic occurs at the optical thickness of the ORU, the 3$^{rd}$ order reflection harmonic occurs at ⅔ of the optical thickness of the ORU, and so on.

Another optical property of an ORU is termed its intrinsic bandwidth. The intrinsic bandwidth (IBW) is a measure of the strength of coherence among adjacent ORUs (within a layer stack) in terms of constructive interference leading to reflectivity. ORUs contribute to reflectivity not only at the resonant wavelength, but also on either side of the resonant wavelength (higher and lower wavelengths) as determined by the ORU's intrinsic bandwidth. Intrinsic bandwidth for the m$^{th}$ order reflection harmonic is given by:

$$IBW_m = \left(\frac{4}{\pi}\right) \cdot \left|\frac{(1 - a_m N_r)}{(1 + a_m N_r)}\right|,$$

where $N_r = n_L/n_H$ and $\alpha_m$ is the relative reflective power coefficient for the mth order harmonic, as shown in FIG. 5A. So, for example, a 2$^{nd}$ order reflection harmonic, with an f-ratio of 0.25, the relative reflective power coefficient $\alpha_m$ will have a value of 0.5.

When the $IBW_m$ is evaluated for a given reflection harmonic order m, and a given ORU f-ratio, it can be multiplied by the resonant wavelength of the ORU, to give a fractional bandwidth $\Delta\lambda_m$. This fractional bandwidth $\Delta\lambda_m = IBW_m * \lambda_{0,m}$ is a measure of the range of wavelengths over which the ORU and other ORUs of like property, will coherently act to create reflection. Indeed, a microlayer stack consisting of a large number of identical ORUs, such that the reflectivity at the common resonate wavelength is very large (approaching 1 or 100%), will have a reflection band that extends on either side of the resonant wavelength by $\Delta\lambda_m/2$.

When numerous ORUs that are neighbors in a microlayer stack that is graded from thin to thick layers in a substantially monotonic fashion, have fractional bandwidths $\Delta\lambda_m$ that overlap one another, coherent reflection is generated. Indeed, for any given ORU, with its associated resonant wavelength, one can analyze the fractional bandwidths, $\Delta\lambda_m$, of neighboring ORUs and so determine the number of neighboring ORUs whose fractional bandwidths overlap the given ORU's resonant wavelength. Each of those neighboring ORUs with fractional bandwidths that overlay the given ORU's resonant wavelength act coherently with the given ORU to generate reflectivity at the given ORU's resonant wavelength.

This first principles logic suggests a methodology in which a modeled or a measured microlayer stack of ORUs, with known refractive index values, can be analyzed in terms of each ORUs resonant wavelengths $\lambda_{0,m}$ and fractional bandwidths $\Delta\lambda_m$. For each ORU's resonant wavelength, one can count the number of neighboring ORUs whose fractional bandwidth overlaps the given resonate wavelength. This count, termed the Coherent Neighbors Count (CNC), can then be used to determine a reflectivity level at the given resonant wavelength. To quantitatively determine the reflectivity level, we employ a standard formula that relates reflectivity to the number of ORUs coherently contributing to reflectivity, and the ORU layer material refractive index values:

$$R_m = \left(\frac{(1 - a_m N_r^{2CNC})}{(1 + a_m N_r^{2CNC})}\right)^2.$$

While this standard reflectivity formula is most accurate for a microlayer stack of identical ORUs, it provides an excellent reflectivity approximation for microlayer stacks with a graded optical thickness profile. By this method, the reflectivity at each resonant wavelength (associated with each ORU) within a microlayer stack, can be calculated by determining the value of the Coherent Neighbors Count (CNC).

This method allows one skilled in the art, to use a measured microlayer stack thickness distribution, along with known refractive index values of the layer material, to map the wavelength-extent of an arbitrary-order reflection band, and in addition to quantitatively define the short-wavelength start of a given reflection band, and the long-wavelength end for the same reflection band.

In addition, by performing the analysis described above, one skilled in the art can separately determine the wavelength-extent of multiple reflection bands, of various orders, deriving from a given microlayer stack, where the measured reflection spectrum shows a single wavelength region of high reflectivity due to significant reflection band overlap, and the individual reflection band harmonies are indecipherable.

For purposes of this application, we choose to define the onset of a given harmonic reflection band (of order m) of a microlayer stack as the shortest resonant wavelength $\lambda_{S,m}$ for which the CNC provides an $R_m$ value that is >25% of the associated reflection band peak reflectivity. Similarly, we define the wavelength representing the end of the reflection band as the longest resonant wavelength $\lambda_{L,m}$ for which the CNC provides an $R_m$ value that is >25% of the associated reflection band peak reflectivity. Using this methodology, we can repeatably determine the wavelength $\lambda_S$ of the short wavelength band edge and the wavelength $\lambda_L$ of the long wavelength band edge of a given reflection band.

Further details and discussion of the bandwidth analysis methodology can be found in the U.S. patent application Ser. No. 13/844,664 cited above.

First Modeled Stack

A multilayer optical film having a first modeled stack was designed and modeled. The stack used N low index microlayers arranged in alternating fashion with N high index microlayers to form N ORUs, where N was 138. Each ORU consisted of one of the low index microlayers (material "B") and one of the high index microlayers (material "A"). The refractive index $n_L$ of the low index microlayers was 1.494, and the refractive index $n_H$ of the high index microlayers was 1.65. These indices are representative of commonly used materials in polymeric interference filters. No dispersion with wavelength was used, so that the band edge wavelengths of higher order bands were, nominally, simple integer divisions of the respective first order band edge wavelengths, and so that the reflectivity within each band was nominally constant, aside from minor spectral oscillations. (In real materials, the change in refractive index with wavelength will slightly shift the wavelength positions of the higher order reflection bands, and the reflectivity will also tend to be higher at shorter wavelengths than at larger wavelengths.) The first modeled stack, as well as its associated "effective stacks" that were used to calculate individual higher order reflection bands, were also assumed to have one 10 micron thick "skin layer" of refractive index 1.65 on both sides of the stack (as part of the multilayer optical film), since this arrangement is common with extruded polymeric multilayer stacks. An air interface was assumed at the outer major surface of each skin layer.

The ORUs were designed to have an f-ratio of 0.25.

The ORUs also exhibited a graded thickness profile. The thickness profile was defined by a simple power law so as to yield a relatively flat reflection spectrum, i.e. having a substantially constant reflectivity versus wavelength for the first order reflection band, and likewise for each subsequent higher order band that was present. In particular, the physical thickness $d_H$ of the high index microlayer and the physical thickness $d_L$ of the low index microlayer in the nth ORU were determined by the formulas:

$$d_H = \lambda_0 \times f \times \left(\frac{g^n}{2n_H}\right), \text{ and}$$

$$d_L = \lambda_0 \times (1 - f) \times \left(\frac{g^n}{2n_L}\right),$$

where n ranged from 1 to N, f was 0.25, and g was a constant that was selected to define the gradient. In the case of this first modeled stack, g was selected to be 1.00527. Furthermore, $\lambda_0$ was a starting wavelength selected for the stack design. For the first modeled stack, $\lambda_0$ was selected to be 825 nm. These equations and parameters yielded an ORU thickness profile for the first modeled stack shown by curve 1310 in FIG. 13.

The individual $1^{st}$, $2^{nd}$, and $3^{rd}$ order reflection bands produced by the first modeled stack were calculated using the harmonic analysis methodology described above. For each of these individual harmonics, an "effective stack" was defined which allowed us to calculate the reflection spectrum for that harmonic order. For the $1^{st}$ order, the effective stack had N ORUs (i.e., 138) with an ORU thickness profile given by curve 1310 in FIG. 13, assumed an f-ratio of 0.5, and used a Fourier coefficient $c_1$ of 0.70711 to calculate the effective refractive indices. For the $2^{nd}$ order, the effective stack had 2N ORUs (i.e., 276) with an ORU thickness profile given by curve 1312 in FIG. 13, assumed an f-ratio of 0.5, and used a Fourier coefficient $c_2$ of 0.5 to calculate the effective refractive indices. For the $3^{rd}$ order, the effective stack had 3N ORUs (i.e., 414) with an ORU thickness profile given by curve 1314 in FIG. 13, assumed an f-ratio of 0.5, and used a Fourier coefficient $c_3$ of 0.235702 to calculate the effective refractive indices. Computations performed on these effective stacks yielded the $1^{st}$ order, $2^{nd}$ order, and $3^{rd}$ order spectral reflectivity curves shown in FIG. 14A.

The bandwidth analysis methodology described above was then used to determine the wavelength $\lambda_S$ of the short wavelength band edge, and the wavelength $\lambda_L$ of the long wavelength band edge, for each of the $1^{st}$, $2^{nd}$, and $3^{rd}$ order reflection bands shown in FIG. 14A. Three line segments are superimposed on the graph, each line segment representing the location of its associated harmonic reflection band as determined by the bandwidth analysis methodology. Each line segment is a linear representation of its associated reflection band. The line segments are labeled "LSR" for "line segment representation", and are defined by their endpoints as determined by the bandwidth analysis methodology. Thus, each line segment LSR has a short wavelength endpoint labeled "S", whose wavelength value $\lambda_S$ is the wavelength of the left band edge of the reflection band, and a long wavelength endpoint labeled "L", whose wavelength value $\lambda_L$ is the wavelength of the right band edge of the reflection band. By superimposing the line segments LSR on the reflection spectrum, one can readily see precisely where the $1^{st}$, $2^{nd}$, and $3^{rd}$ order reflection bands are located on the wavelength axis. From this one can also see that, for this first modeled stack, the $2^{nd}$ order reflection band overlaps both the $1^{st}$ order reflection band and the $3^{rd}$ order reflection band. The overlap of these harmonic reflection bands produces a single widened reflection band, as can be seen in FIG. 14B. FIG. 14B plots the calculated reflectivity of the first modeled stack using a conventional optical modeling calculation that does not attempt to distinguish one harmonic order from another, i.e., it simply calculates the overall reflectivity of the stack as a function of wavelength. Comparison of FIGS. 14A and 14B reveals that the single wide reflection band of FIG. 14B comprises overlapping $1^{st}$, $2^{nd}$, and $3^{rd}$ order reflection bands.

Relevant parameters relating to the first modeled stack are summarized in the table below.

First Modeled Microlayer Stack

| order m | f-ratio | N | gradient | Cm | $n_H$ | $n_L$ | $\lambda_0$ |
|---|---|---|---|---|---|---|---|
| all | 0.25 | 138 | 1.00527 | n.a. | 1.65 | 1.494 | 825 |
| 1 | 0.5 | 138 | 1.00527 | 0.70711 | 1.627154 | 1.516846 | 825 |
| 2 | 0.5 | 276 | 1.002635 | 0.5 | 1.611 | 1.533 | 413 |
| 3 | 0.5 | 414 | 1.001757 | 0.235702 | 1.590385 | 1.553615 | 275 |

The reflection spectrum of FIG. 14B was obtained using conventional optical modeling software that calculates in a straightforward manner the overall reflectivity of the stack as a function of wavelength. Alternatively, such a reflection spectrum may be obtained by optically combining the individual harmonic reflectivities as shown for example in FIG. 14A. It can be shown that the additive nature of the various higher order bands at any given wavelength follows the rule for a "pile of plates" reflector, although some attention should be paid to reflections that may occur at the outer air interfaces. In this first modeled film, the total reflectivity of the $2^{nd}$ order harmonic is about 0.63 or (63%) near 450 nm, and the reflectivity of the $3^{rd}$ order band is about 0.33 (or 33%). The modeled reflectivity of FIG. 14B exhibits an average reflectivity from about 440 to 450 nm of about 0.676. The modeled optical film of FIG. 14B has two air interfaces, while the separately calculated $2^{nd}$ and $3^{rd}$ harmonic orders have a combined total of 4 film/air interfaces. Two of these air interfaces needed to be mathematically removed before the "pile-of-plates" formula discussed above can be used to calculate the reflectivity of the two effective stacks in order to compare it to the reflectivity of the single stack of microlayers that produces both orders of reflectivity. To mathematically remove the excess air interfaces, the reflectivity of one air/polymer interface (refractive index of 1.65), labeled as "air", was first calculated as $$\text{air} = \left(\frac{1.65 - 1.00}{1.65 + 1.00}\right)^2.$$

The internal reflectivity $R_{int}$ of the effective $3^{rd}$ order film stack was then calculated by the following formula:

$$R_{int} = \frac{1 - \text{air} - (1 + \text{air}) \times T_{Total}}{1 - \text{air} - 2 \times \text{air} \times T_{Total}},$$

where $R_{int}$ refers to the internal reflectivity (discussed above) of the film stack, "air" refers to the calculated reflectivity of the air/polymer interface, and "$T_{Total}$" refers to the calculated total reflectivity of the stack in air. $R_{int}$ for the $3^{rd}$ order and was calculated to be 0.267. The two values of R1 and R2 in the pile-of-plates formula are then 0.267 and 0.63, which yields a predictive combined reflectivity of the $2^{nd}$ and $3^{rd}$ order bands near 450 nm to be R=0.674. This is close to the average value of 0.676 for the spectral reflectivity curve of FIG. 14B near 450 nm.

In FIGS. 15A, 15B, and 15C, we compare the first modeled stack to a first comparative microlayer stack, whose relevant reflection band has no $2^{nd}$ order component and is produced almost exclusively by a $1^{st}$ order harmonic. FIG. 15A plots modeled reflectivity as a function of wavelength. Curve 1510 is the same as the reflectivity curve in FIG. 14B, and represents the overall reflectivity of the first modeled stack. Curve 1512 is the reflectivity of the first comparative microlayer stack. The first comparative stack used the same number N of ORUs (138) and the same high and low refractive indices (1.65 and 1.494 respectively) for the "A" and "B" microlayers. However, the first comparative stack used an f-ratio of 0.5, which produces no $2^{nd}$ order reflections. Both stack designs produce relatively small but equal $3^{rd}$ order reflection bands which are not separately plotted, but whose additive reflectivities can be observed at wavelengths from about 400 nm to 550 nm. Since the $3^{rd}$ order contributions are equal for the two stack designs, we choose to ignore them in the analysis that follows.

Also, the ORU thickness profile of the first comparative stack had to be changed relative to that of the first modeled stack in order to force the reflection spectrum of the first comparative stack to substantially match that of the first modeled stack. The optical thickness profiles are plotted in FIG. 15B.

In that figure, curve 1520 is the ORU thickness profile of the first modeled stack, and is the same as curve 1310 in FIG. 13. Curve 1522 is the ORU thickness profile of the first comparative stack. Two things are apparent from this figure. First, the first modeled stack (curve 1520) can be seen to have a less drastic taper of the ORU thickness profile than the first comparative stack (curve 1522). In fact, the ratio of the thickest ORU to the thinnest ORU is 4 for the first comparative stack, but only 2 for the first modeled stack. Second, the first modeled stack uses ORUs (and microlayers) that are generally thicker than those of the first comparative stack. For example, the thinnest ORU in the first comparative stack is 200 nm thick, while the thinnest ORU in the first modeled stack is 400 nm thick. The thicker layers and less drastic taper can make the first modeled stack easier to manufacture than the first comparative stack, as explained above.

FIG. 15C is a reproduction of FIG. 12, except that two points are plotted on the graph to represent the operation of the first microlayer stack (point P1) and the first comparative microlayer stack (point P2). The first comparative stack utilizes only the $1^{st}$ order reflection band ("$1^{st}$"), and operates at an f-ratio of 0.5, whereby the point P2 has a relative reflective power of 1.0. On the other hand, the first modeled stack operates at an f-ratio of 0.25, at which the relative reflective power of the $1^{st}$ order reflection is substantially diminished. But, because the first modeled stack utilizes both the $1^{st}$ and $2^{nd}$ order reflection bands ("$1^{st}+2^{nd}$"), its associated point P2 also has a relative reflective power of 1.0.

Relevant parameters relating to the comparison of the first modeled stack and the first comparative stack ("wideband 1") are summarized in the table below.

First Modeled Stack Versus First Comparative Stack

| order m | f-ratio | N | gradient | Cm | $n_H$ | $n_L$ | $\lambda_0$ |
|---|---|---|---|---|---|---|---|
| all | 0.25 | 138 | 1.00527 | n.a. | 1.65 | 1.494 | 825 |
| wideband 1 | 0.5 | 138 | 1.01048 | n.a. | 1.65 | 1.494 | 405 |

Second Modeled Stack

Another multilayer optical film having a second modeled stack was designed and modeled. The stack used N low index microlayers arranged in alternating fashion with N high index microlayers to form N ORUs, where N was 138. Each ORU consisted of one of the low index microlayers (material "B") and one of the high index microlayers (material "A"). The refractive index $n_L$ of the low index microlayers was 1.494, and the refractive index $n_H$ of the high index microlayers was 1.65. No dispersion with wavelength was used. The second modeled stack, as well as its associated "effective stacks" that were used to calculate individual higher order reflection bands, were also assumed to have one 10 micron thick "skin layer" of refractive index 1.65 on both sides of the stack (as part of the multilayer optical film). An air interface was assumed at the outer major surface of each skin layer.

The ORUs were designed to have an f-ratio of 0.33. As seen from FIG. 5A, this f-ratio produces substantially no $3^{rd}$ order harmonic reflections.

The ORUs exhibited the same graded thickness profile as the first modeled stack. Thus, the ORU thickness profile for the second modeled stack is also shown by the curve 1310 of FIG. 13.

The individual $1^{st}$ and $2^{nd}$ order reflection bands produced by the second modeled stack were calculated using the harmonic analysis methodology described above. For each of these individual harmonics, an "effective stack" was defined which allowed us to calculate the reflection spectrum for that harmonic order. For the $1^{st}$ order, the effective stack had N ORUs (i.e., 138) with an ORU thickness profile given by curve 1310 in FIG. 13, assumed an f-ratio of 0.5, and used a Fourier coefficient $c_1$ of 0.860742 to calculate the effective refractive indices. For the $2^{nd}$ order, the effective stack had 2N ORUs (i.e., 276) with an ORU thickness profile given by curve 1312 in FIG. 13, assumed an f-ratio of 0.5, and used a Fourier coefficient $c_2$ of 0.438153 to calculate the effective refractive indices. Computations performed on these effective stacks yielded the $1^{st}$ and $2^{nd}$ order spectral reflectivity curves shown in FIG. 16A.

The bandwidth analysis methodology described above was then used to determine the wavelength $\lambda_S$ of the short wavelength band edge, and the wavelength $\lambda_L$ of the long wavelength band edge, for each of the $1^{st}$ and $2^{nd}$ order reflection bands shown in FIG. 16A. Two line segments are superimposed on the graph, each line segment representing the location of its associated harmonic reflection band as determined by the bandwidth analysis methodology. Each line segment is a linear representation of its associated reflection band and is labeled "LSR", with a short wavelength endpoint labeled "S" and a long wavelength endpoint labeled "L". By superimposing the line segments LSR on the reflection spectrum, one can see precisely where the $1^{st}$ and $2^{nd}$ order reflection bands are located on the wavelength axis. From this one can also see that, for this second modeled stack, the $2^{nd}$ order reflection band overlaps the $1^{st}$ order reflection band (but not the $3^{rd}$ order reflection band). The overlap of these harmonic reflection bands produces a single widened reflection band, as can be seen in FIG. 16B. FIG. 16B plots the calculated reflectivity of the second modeled stack using a conventional optical modeling calculation that does not attempt to distinguish one harmonic order from another, i.e., it simply calculates the overall reflectivity of the stack as a function of wavelength. Comparison of FIGS. 16A and 16B reveals that the single wide reflection band of FIG. 16B comprises overlapping $1^{st}$ and $2^{nd}$ order reflection bands. Note also that due to the different levels of reflectivity of the $1^{st}$ and $2^{nd}$ order reflection bands, the overall reflection spectrum of the second modeled stack has an abrupt step change in reflectivity. This is so despite the smoothly varying ORU thickness profile used in the stack (curve 1310 in FIG. 13).

Relevant parameters relating to the second modeled stack are summarized in the table below.

Second Modeled Microlayer Stack

| order m | f-ratio | N | gradient | Cm | $n_H$ | $n_L$ | $\lambda_0$ |
|---|---|---|---|---|---|---|---|
| all | 0.33 | 138 | 1.00527 | n.a. | 1.65 | 1.494 | 825 |
| 1 | 0.5 | 138 | 1.00527 | 0.860742 | 1.639138 | 1.504862 | 825 |
| 1 | 0.5 | 276 | 1.002635 | 0.438153 | 1.606176 | 1.537824 | 413 |

In connection with FIG. 16C, we investigate how the second modeled stack would perform if it was modified to have an f-ratio of 0.36 rather than 0.33. Curve 1610 is the reflectivity spectrum for the second modeled stack, i.e., the same as the reflectivity spectrum shown in FIG. 16B. Curve 1612 is the reflectivity spectrum calculated for the modified stack. Note that a single wide reflection band is again produced, and again with an abrupt step change in reflectivity. The step change for curve 1612 is greater than that of curve 1410 due to the higher average reflectivity in the 900-1600 nm range and the lower average reflectivity in the 450-800 nm range. The increase in f-ratio from 0.33 to 0.36 produces a weak $3^{rd}$ order response which can be detected in spectrum 1612 at wavelengths from about 400 to 550 nm.

Third Modeled Stack

Another multilayer optical film having a third modeled stack was designed and modeled. The stack used N low index microlayers arranged in alternating fashion with N high index microlayers to form N ORUs, where N was 138. Each ORU consisted of one of the low index microlayers (material "B") and one of the high index microlayers (material "A"). The refractive index $n_L$ of the low index microlayers was 1.494, and the refractive index $n_H$ of the high index microlayers was 1.65. No dispersion with wavelength was used. The third modeled stack, as well as its associated "effective stacks" that were used to calculate individual higher order reflection bands, were also assumed to have one 10 micron thick "skin layer" of refractive index 1.65 on both sides of the stack (as part of the multilayer optical film). An air interface was assumed at the outer major surface of each skin layer.

The ORUs were designed to have an f-ratio of 0.59. As seen from FIG. 5A, this f-ratio produces substantial $1^{st}$, $2^{nd}$, $3^{rd}$, and $4^{th}$ order harmonic reflections, and the reflective power of the $2^{nd}$ and $3^{rd}$ harmonics are substantially equal to each other.

The ORUs exhibited a graded thickness profile characterized by a gradient constant g equal to 1.003. Furthermore, the starting wavelength $\lambda_0$ was selected to be 1215 nm. Using these parameters in the gradient thickness equations discussed above yielded an ORU thickness profile for the third modeled stack shown by curve 1710 in FIG. 17.

The individual $1^{st}$, $2^{nd}$ and $3^{rd}$ order reflection bands produced by the third modeled stack were calculated using the harmonic analysis methodology described above. For each of these individual harmonics, an "effective stack" was defined which allowed us to calculate the reflection spectrum for that harmonic order. For the $1^{st}$ order, the effective stack had N ORUs (i.e., 138) with an ORU thickness profile given by curve 1710 in FIG. 17, assumed an f-ratio of 0.5, and used a Fourier coefficient $c_1$ of 0.9603 to calculate the effective refractive indices. For the $2^{nd}$ order, the effective stack had 2N ORUs (i.e., 276) with an ORU thickness profile given by curve 1712 in FIG. 17, assumed an f-ratio of 0.5, and used a Fourier coefficient $c_2$ of 0.267913 to calculate the effective refractive indices. For the $3^{rd}$ order, the effective stack had 3N ORUs (i.e., 414) with an ORU thickness profile given by curve 1714 in FIG. 17, assumed an f-ratio of 0.5, and used a Fourier coefficient $c_3$ of 0.220437 to calculate the effective refractive indices. Computations performed on these effective stacks yielded the $1^{st}$, $2^{nd}$, and $3^{rd}$ order spectral reflectivity curves shown in FIG. 18A.

The bandwidth analysis methodology described above was then used to determine the wavelength $\lambda_S$ of the short wavelength band edge, and the wavelength $\lambda_L$ of the long wavelength band edge, for each of the $1^{st}$, $2^{nd}$, and $3^{rd}$ order reflection bands shown in FIG. 18A. Three line segments are superimposed on the graph, each line segment representing the location of its associated harmonic reflection band as determined by the bandwidth analysis methodology. Each line segment is a linear representation of its associated reflection band and is labeled "LSR", with a short wavelength endpoint labeled "S" and a long wavelength endpoint labeled "L". By superimposing the line segments LSR on the reflection spectrum, one can see precisely where the $1^{st}$, $2^{nd}$, and $3^{rd}$ order reflection bands are located on the wavelength axis. From this one can see that, for this third modeled stack, the $2^{nd}$ order reflection band does not overlap the $1^{st}$ order reflection band, and it does not overlap the $3^{rd}$ order reflection band but is very close to the $3^{rd}$ order reflection band. In fact, the short wavelength endpoint S of the $2^{nd}$ order band occurs at 626 nm and the long wavelength endpoint L of the $3^{rd}$ order band occurs at 597 nm, and the difference between these two wavelengths (29 nm) is less than 5% of 626 nm. Hence the $2^{nd}$ and $3^{rd}$ order reflection bands of the third modeled stack substantially overlap. The substantial overlap of these harmonic reflection bands (as well as the overlap of the $3^{rd}$ and $4^{th}$ order reflection bands, not shown) produces a single widened reflection band 1810, as can be seen in FIG. 18B. FIG. 18B plots the calculated reflectivity of the third modeled stack using a conventional optical modeling calculation that does not attempt to distinguish one harmonic order from another, i.e., it simply calculates the overall reflectivity of the stack as a function of wavelength. Comparison of FIGS. 18A and 18B reveals that the single wide reflection band 1810 of FIG. 18B comprises overlapping $2^{nd}$ and $3^{rd}$ order reflection bands. An abrupt step change can also be seen in the band 1810, which is due to overlap of the $3^{rd}$ and $4^{th}$ order reflection bands. This abrupt step change is present in the reflection band despite the smoothly varying ORU thickness profile used in the stack (curve 1710 in FIG. 17).

Relevant parameters relating to the third modeled stack are summarized in the table below.

Third Modeled Microlayer Stack

| order m | f-ratio | N | gradient | Cm | $n_H$ | $n_L$ | $\lambda_0$ |
|---|---|---|---|---|---|---|---|
| all | 0.59 | 138 | 1.003 | n.a. | 1.65 | 1.494 | 1215 |
| 2 | 0.5 | 276 | 1.0015 | 0.267913 | 1.5929 | 1.5511 | 608 |
| 3 | 0.5 | 414 | 1.001 | 0.220437 | 1.58919 | 1.55481 | 405 |

Second Comparative Microlayer Stack

Figure 19:
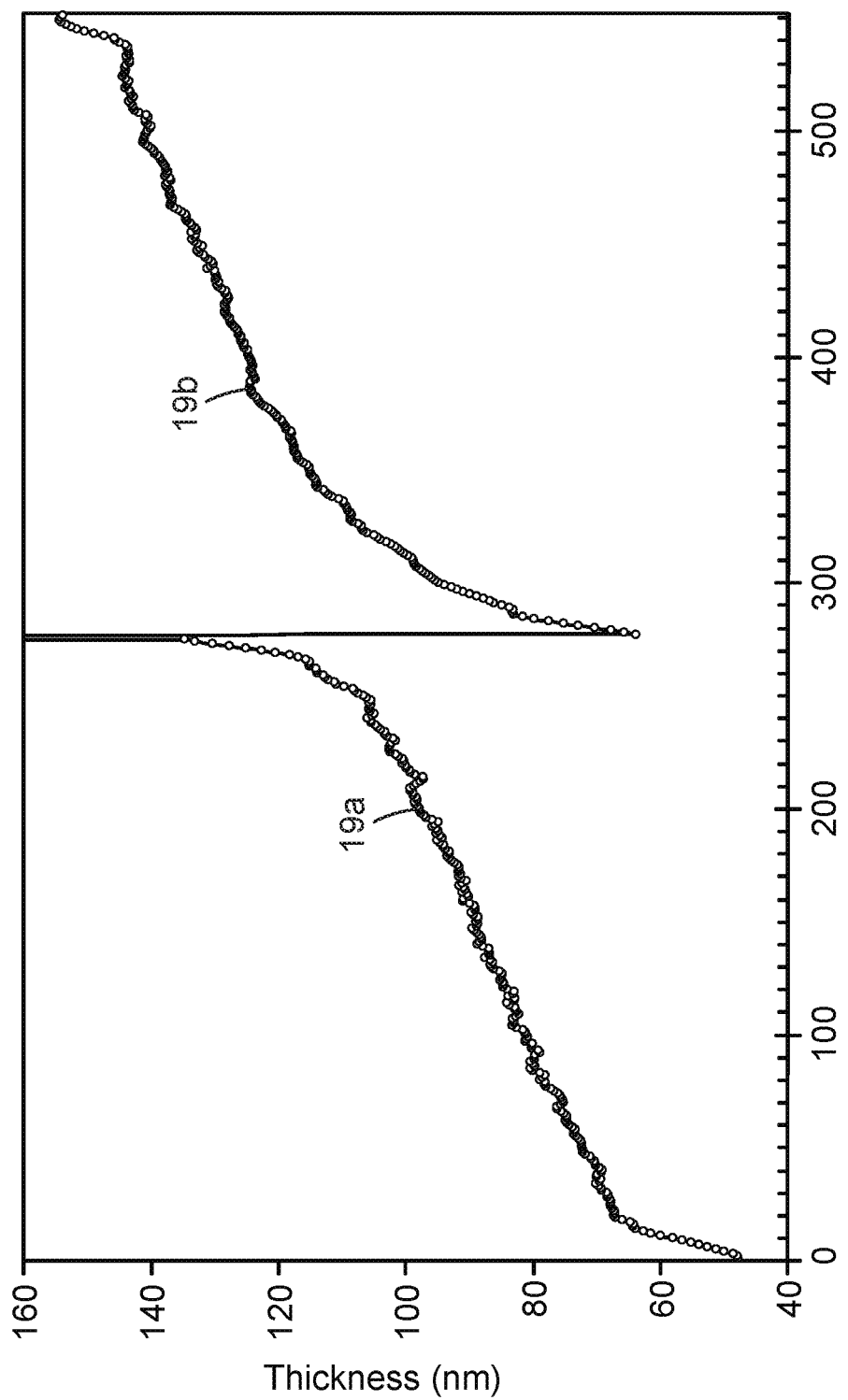
FIG. 19 is a layer thickness profile graph of an optical film having two apodized optical packets or stacks of microlayers, including a microlayer stack referred to herein as a second comparative stack.

We now turn our attention to an oriented multilayer optical film referred to as Example 1 in the U.S. patent application Ser. No. 13/844,664 cited above. That optical film comprises two apodized microlayer stacks, referred to in the '664 application as "packet 1" and "packet 2", separated by an optically thick polymer layer. For purposes of the present description, the packet 2 is referred to herein as the second comparative microlayer stack, or simply the second comparative stack. Each of the two stacks contains 275 layers of alternating low and high index polymers, the high index material being a 90/10 coPEN (refractive index 1.795) for both stacks, and the low index material being a 55/45 coPEN (isotropic refractive index 1.605) for packet 1, and NEOSTAR FN007 copolyester (refractive index 1.505) for packet 2. The layer thickness values of the multilayer optical film was measured using Atomic Force Microscopy (AFM), and the layer thickness profiles 19a and 19b for packets 1 and 2 are shown in FIG. 19.

Figure 20:
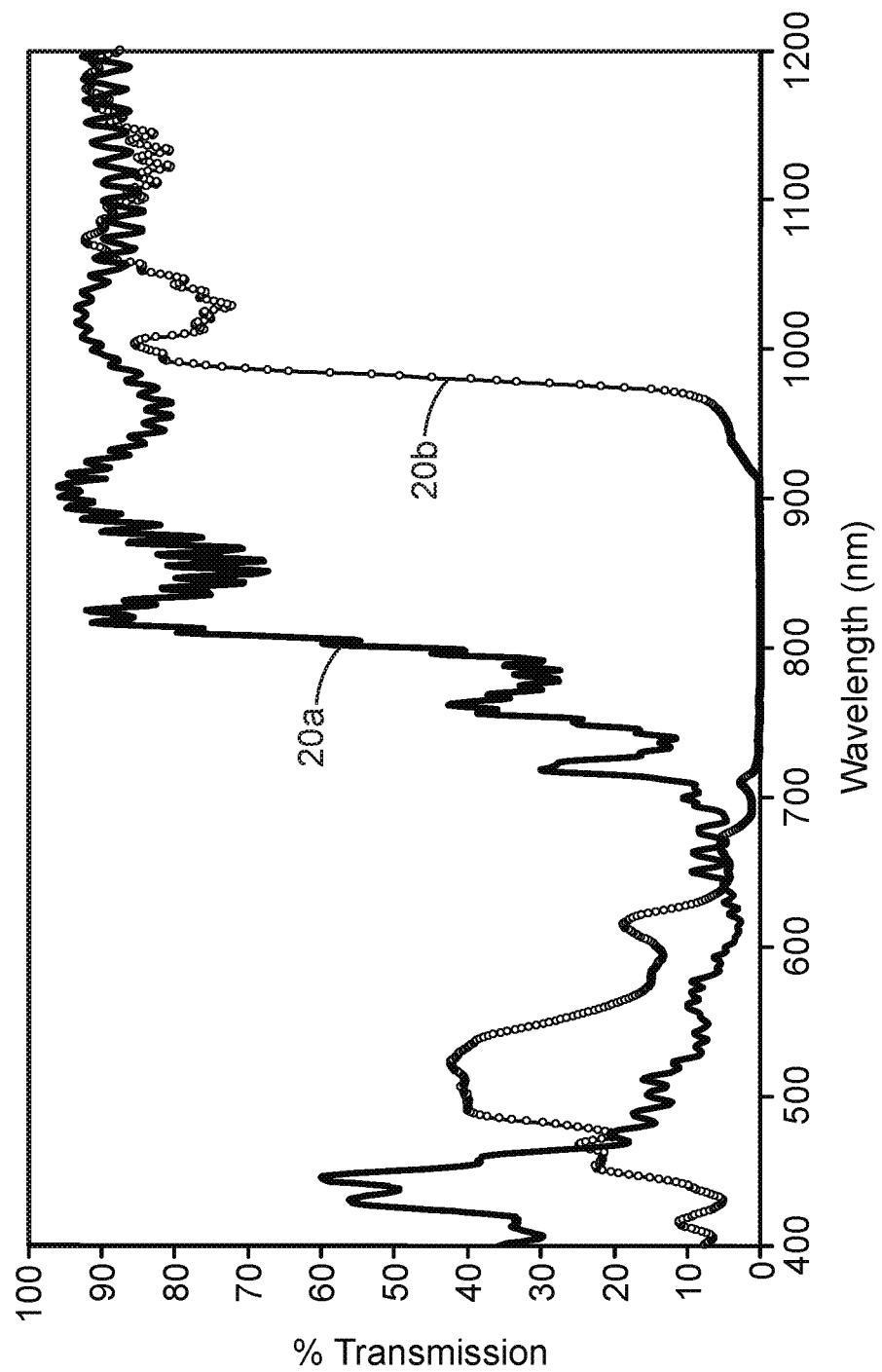
FIG. 20 is a graph of the transmission spectra resulting from the layer thickness profiles for the second comparative stack and the other microlayer stack of FIG. 19.

FIG. 20 plots the measured transmission spectrum of the oriented multilayer optical film along the block axis of the film, with the curve 20a representing the block axis spectrum of packet 1, and the curve 20b representing the block axis spectrum of packet 2.

By performing an optical model "spectral fitting" exercise, employing the measured refractive index values for the stretched polymers of this example, and the measured layer thicknesses defining the ORUs of the packets, a best fit to the measured spectra was found by varying the f-ratio for ORUs within each packet. In addition, a small adjustment to the overall thickness of packet 2 was made (5% thinner) to best match the modeled spectra to the measured spectra. In this exercise, it was found that the measured spectra for packet 1 was best matched by assuming an f-ratio of 0.64, and the measured spectra for packet 2 was best matched by assuming an f-ratio of 0.62.

Figure 21:
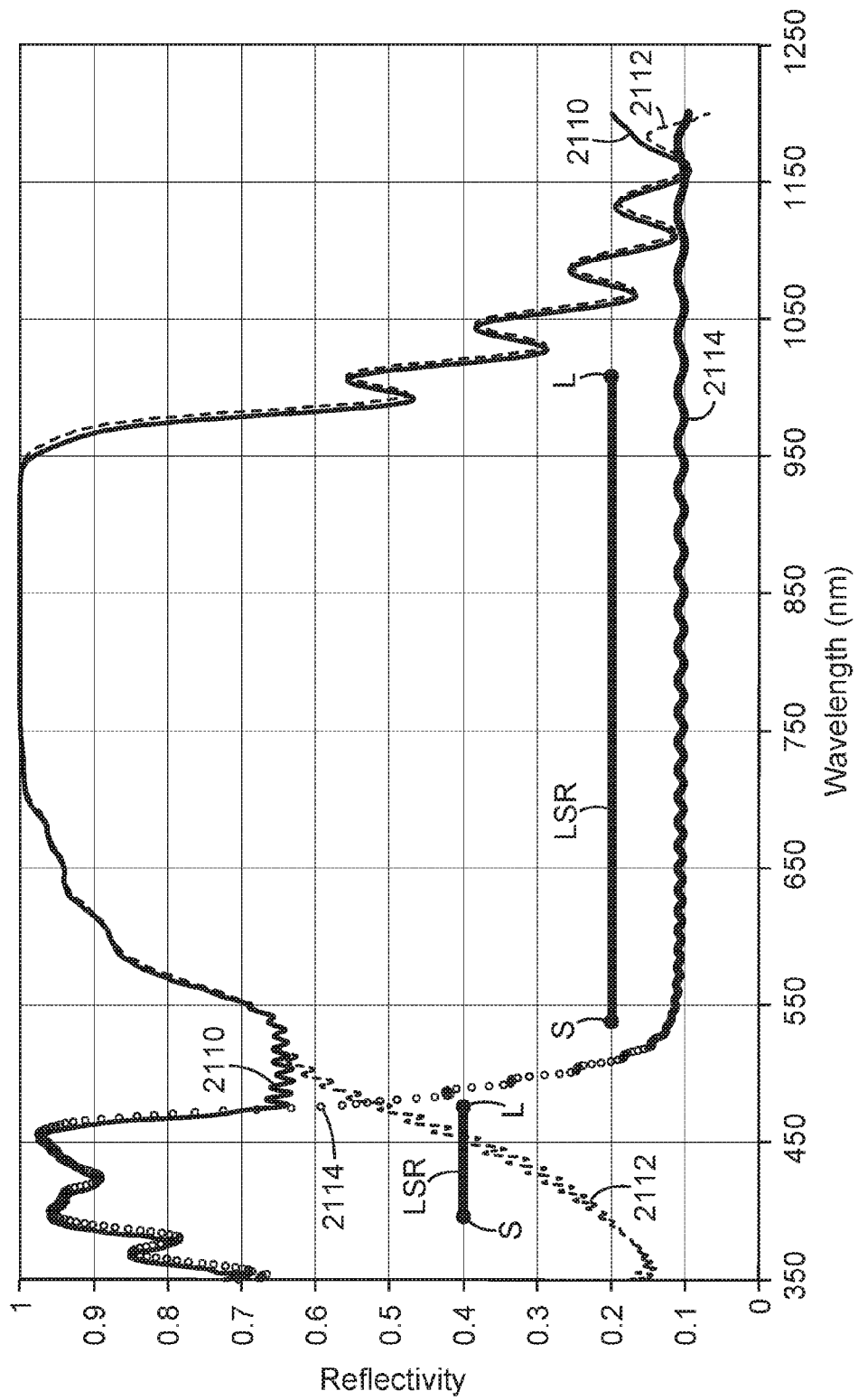
FIG. 21 is a graph of calculated or modeled overall spectral reflectivity of the second comparative stack, where our methodology is used to separately plot and identify the $1^{st}$ and $2^{nd}$ order reflection bands produced by the second comparative stack.

This analysis provides us with a model of the relevant characteristics of the packet 2, i.e., of the second comparative stack, from which we can calculate overall reflectivity and specific harmonic reflectivity as discussed above. Curve 2110 in FIG. 21 plots the calculated reflectivity of the second comparative stack using a conventional optical modeling calculation that does not attempt to distinguish one harmonic order from another, i.e., it simply calculates the overall reflectivity of the stack as a function of wavelength. The individual $1^{st}$ and $2^{nd}$ order reflection bands produced by the modeled packet 2 were calculated using the harmonic analysis methodology described above. For each of these individual harmonics, an "effective stack" was defined Which allowed us to calculate the reflection spectrum for that harmonic order. Computations performed on these effective stacks yielded a $1^{st}$ order spectral reflectivity curve, plotted as curve 2112 in FIG. 21, and a $2^{nd}$ order spectral reflectivity curve, plotted as curve 2114 in FIG. 21. The bandwidth analysis methodology described above was then used to determine the wavelength $\lambda_S$ of the short wavelength band edge, and the wavelength $\lambda_L$ of the long wavelength band edge, for each of the $1^{st}$ and $2^{nd}$ order reflection bands shown in FIG. 21. Two line segments are superimposed on the graph, each line segment representing the location of its associated harmonic reflection band as determined by the bandwidth analysis methodology. Each line segment is a linear representation of its associated reflection band and is labeled "LSR", with a short wavelength endpoint labeled "S" and a long wavelength endpoint labeled "L". By superimposing the line segments LSR on the reflection spectrum, one can see precisely where the $1^{st}$ and $2^{nd}$ order reflection bands are located on the wavelength axis. From this one can see that, for this second comparative stack, the $2^{nd}$ order reflection band does not overlap the $1^{st}$ order reflection band. Furthermore, the nearest band edges of the $1^{st}$ and $2^{nd}$ nd order reflection bands are not within 5% of each other, hence, the $2^{nd}$ order reflection band also does not substantially overlap the $1^{st}$ order reflection band.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Any direction referred to herein, such as "top," "bottom," "left," "right," "upper," "lower," "above," "below," and other directions and orientations are used for convenience in reference to the figures and are not to be limiting of an actual device, article, or system or its use. The devices, articles, and systems described herein may be used in a variety of directions and orientations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

What is claimed is:

1. A mirror film composed of a multilayer optical film comprising a stack of microlayers arranged into optical repeat units;
    wherein, at a design angle of incidence, the stack provides a $1^{st}$ order reflection band, a $2^{nd}$ order reflection band, and optionally a $3^{rd}$ order reflection band;
    wherein the $1^{st}$ order reflection band is disposed at least partially in a wavelength range from 720 to 2000 nm;
    wherein the $2^{nd}$ order reflection band is disposed at least partially in a wavelength range from 380 to 720 nm;
    wherein the $2^{nd}$ order reflection band substantially overlaps at least one of the $1^{st}$ and $3^{rd}$ order reflection bands to form a single wide reflection band; and
    wherein the single wide reflection band is associated with orthogonal polarization states.

2. The film of claim 1, wherein the $2^{nd}$ order reflection band substantially overlaps the $1^{st}$ order reflection band, such that the single wide reflection band includes the $1^{st}$ and $2^{nd}$ order reflection bands.

3. The film of claim 2, wherein the stack does not provide the $3^{rd}$ order reflection band.

4. The film of claim 2, wherein the stack provides the $3^{rd}$ order reflection band.

5. A polarizer film composed of a multilayer optical film comprising a stack of microlayers arranged into optical repeat units;
    wherein, at a design angle of incidence, the stack provides a $1^{st}$ order reflection band, a $2^{nd}$ order reflection band, and optionally a $3^{rd}$ order reflection band;
    wherein the $1^{st}$ order reflection band is disposed at least partially in a wavelength range from 720 to 2000 nm;
    wherein the $2^{nd}$ order reflection band is disposed at least partially in a wavelength range from 380 to 720 nm;
    wherein the $2^{nd}$ order reflection band substantially overlaps at least one of the $1^{st}$ and $3^{rd}$ order reflection bands to form a single wide reflection band; and
    wherein the single wide reflection band is associated with only one polarization state.

6. The film of claim 5, wherein the $2^{nd}$ order reflection band substantially overlaps the $1^{st}$ order reflection band, such that the single wide reflection band includes the $1^{st}$ and $2^{nd}$ order reflection bands.

7. The film of claim 6, wherein the stack does not provide the $3^{rd}$ order reflection band.

8. The film of claim 6, wherein the stack provides the $3^{rd}$ order reflection band.

9. A multilayer optical film comprising a stack of microlayers arranged into optical repeat units;
   wherein, at a design angle of incidence, the stack provides a $1^{st}$ order reflection band, a $2^{nd}$ order reflection band, and optionally a $3^{rd}$ order reflection band;
   wherein the $1^{st}$ order reflection band is disposed at least partially in a wavelength range from 720 to 2000 nm;
   wherein the $2^{nd}$ order reflection band is disposed at least partially in a wavelength range from 380 to 720 nm;
   wherein the $2^{nd}$ order reflection band substantially overlaps at least one of the $1^{st}$ and $3^{rd}$ order reflection bands to form a single wide reflection band; and
   wherein the single wide reflection band includes an abrupt step change in reflectivity and transmission in the $1^{st}$ order reflection band.

10. The film of claim 9, wherein a portion of the $2^{nd}$ order reflection band has a lower reflectivity than the $1^{st}$ order reflection band.

11. The film of claim 9, wherein the $2^{nd}$ order reflection band substantially overlaps the $1^{st}$ order reflection band, such that the single wide reflection band includes the $1^{st}$ and $2^{nd}$ order reflection bands.

12. The film of claim 11, wherein the stack does not provide the $3^{rd}$ order reflection band.

13. The film of claim 11, wherein the stack provides the $3^{rd}$ order reflection band.

* * * * *